US012232582B2

(12) United States Patent
Xue

(10) Patent No.: US 12,232,582 B2
(45) Date of Patent: Feb. 25, 2025

(54) ELECTRONIC APPARATUS AND WEARABLE APPARATUS

(71) Applicant: GUANGDONG OPPO MOBILE TELECOMMUNICATIONS CORP., LTD., Guangdong (CN)

(72) Inventor: Yuege Xue, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 169 days.

(21) Appl. No.: 17/981,044

(22) Filed: Nov. 4, 2022

(65) Prior Publication Data

US 2023/0053920 A1 Feb. 23, 2023

Related U.S. Application Data

(62) Division of application No. 16/868,953, filed on May 7, 2020, now Pat. No. 11,528,970.

(30) Foreign Application Priority Data

Sep. 4, 2019 (CN) ......................... 201910831886.7
Sep. 4, 2019 (CN) ......................... 201921469740.4
(Continued)

(51) Int. Cl.
*A44C 5/14* (2006.01)
*A44B 11/25* (2006.01)
(Continued)

(52) U.S. Cl.
CPC ............ *A44C 5/14* (2013.01); *A44B 11/2596* (2013.01); *A44B 17/0011* (2013.01); *A44C 5/18* (2013.01); *G04B 37/18* (2013.01); *Y10T 24/4782* (2015.01)

(58) Field of Classification Search
CPC ......... A44C 5/14; A44C 5/18; A44B 17/0011; A44B 11/2596
See application file for complete search history.

(56) References Cited

U.S. PATENT DOCUMENTS

2019/0361402 A1* 11/2019 Markan .................... A44C 5/14
2020/0390202 A1* 12/2020 Xue ................... G04B 37/1486

FOREIGN PATENT DOCUMENTS

CN 208387991 U 1/2019
CN 110051091 A 7/2019
(Continued)

OTHER PUBLICATIONS

Communication pursuant to Article 94(3) EPC for EP Application 20173879.6 mailed Mar. 7, 2023. (6 pages).
(Continued)

*Primary Examiner* — Robert Sandy
*Assistant Examiner* — Michael S Lee
(74) *Attorney, Agent, or Firm* — Young Basile Hanlon & MacFarlane, P.C.

(57) ABSTRACT

The present disclosure provides an electronic apparatus and a wearable apparatus. The electronic apparatus may include a housing assembly and an electronic component. The housing assembly is configured to connect with a connector, and includes a housing and an engaging member. The housing defines a mounting groove. The engaging member is arranged in the mounting groove and capable of moving relative to the housing to engage with the connector or disengage the connector. The electronic component is disposed in the housing. The housing defines a sink. The housing assembly further includes a baffle mounted in the sink, and the baffle defines a through hole being configured to let the connector pass therethrough.

20 Claims, 25 Drawing Sheets

(30) Foreign Application Priority Data

Jan. 19, 2020 (CN) ......................... 202010060196.9
Jan. 19, 2020 (CN) ......................... 202020136064.5
Jan. 19, 2020 (CN) ......................... 202020136095.0

(51) Int. Cl.
*A44B 17/00* (2006.01)
*A44C 5/18* (2006.01)
*G04B 37/18* (2006.01)

(56) References Cited

FOREIGN PATENT DOCUMENTS

| | | | |
|---|---|---|---|
| WO | 2013076220 | A1 | 5/2013 |
| WO | 2017080011 | A1 | 5/2017 |

OTHER PUBLICATIONS

Communication pursuant to Article 94(3) EPC for EP Application 20175238.3 mailed Mar. 7, 2023. (4 pages).

* cited by examiner

ELECTRONIC APPARATUS AND WEARABLE APPARATUS

CROSS-REFERENCE TO RELATED APPLICATION(S)

The present disclosure is a continuation application of co-pending U.S. patent application Ser. No. 16/868,953, filed on May 7, 2020, which claims priority to Chinese Patent Application No. 201910831886.7 filed on Sep. 4, 2019, Chinese Patent Application No. 201921469740.4 filed on Sep. 4, 2019, Chinese Patent Application No. 202010060196.9 filed on Jan. 19, 2020, Chinese Patent Application No. 202020136064.5 filed on Jan. 19, 2020 and Chinese Patent Application No. 202020136095.0 filed on Jan. 19, 2020, the contents of all of which are incorporated by reference in their entirety herein.

TECHNICAL FIELD

The present disclosure relates to wearable apparatus, and more particularly relates to an electronic apparatus, and a wearable apparatus including the electronic apparatus.

BACKGROUND

A wearable apparatus generally includes an electronic apparatus and a strap for binding the electronic apparatus to a human body. Whether it is easy to assemble the strap with and disassemble the strap from the electronic apparatus is attracting more and more interest.

SUMMARY

According to one aspect of the present disclosure, an electronic apparatus may be provided. The electronic apparatus may include a housing assembly and an electronic component. The housing assembly is configured to connect with a connector, and includes a housing and an engaging member. The housing defines a mounting groove. The engaging member is arranged in the mounting groove and capable of moving relative to the housing to engage with the connector or disengage the connector. The electronic component is disposed in the housing. The housing defines a sink. The housing assembly further includes a baffle mounted in the sink. The baffle defines a through hole being configured to let the connector pass therethrough.

According to another aspect of the present disclosure, an electronic apparatus is provided. The electronic apparatus may include a housing assembly and an electronic component. The housing assembly is configured to connect with a connector, and includes a housing and an engaging member. The housing defines a mounting groove. The engaging member is arranged in the mounting groove and capable of moving relative to the housing to engage with the connector or disengage the connector. The electronic component is disposed in the housing. The mounting groove includes a first mounting groove and a second mounting groove connecting with each other, and the first mounting groove has a first opening and the second mounting groove has a second opening. The engaging member includes an engaging portion and a pressing portion connected to each other. The engaging portion is configured to be mounted in the first mounting groove through the first opening, and the pressing portion is configured to be mounted in the second mounting groove through the second opening. The engaging member is configured to engage with the connector.

According to a further aspect of the present disclosure, a wearable apparatus is provided. The wearable apparatus may include an electronic apparatus, a connector, and a strap body. The electronic apparatus may include a connector, a strap body, and an electronic apparatus. The strap body is connected to the connector. The electronic apparatus includes a housing assembly. The housing assembly is configured to connect with the connector, and includes: a housing, configured to accommodate an electronic component, the housing defining a mounting groove; an engaging member, arranged in the mounting groove and capable of moving relative to the housing to engage with the connector or disengage the connector; and a baffle being coupled to the housing, wherein the baffle defines a through hole being configured to let the connector pass therethrough.

BRIEF DESCRIPTION OF DRAWINGS

In order to describe the technical solutions in the embodiments of the present disclosure more clearly, the drawings illustrative of the embodiments will be briefly described below. Obviously, the drawings in the following description only represent some embodiments of the present disclosure. For those of ordinary skill in the art, other drawings may also be obtained based on these drawings without any creativity.

DETAILED DESCRIPTION

Figure 1:
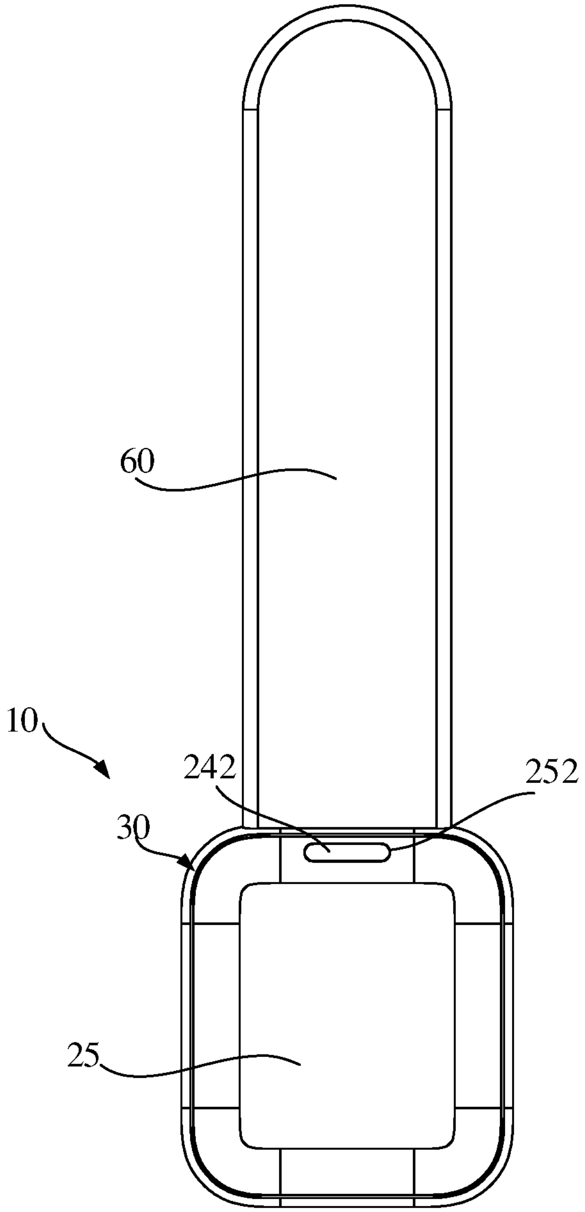
FIG. 1 is a front view of a wearable apparatus according to some embodiments of the present disclosure.
Figure 2:
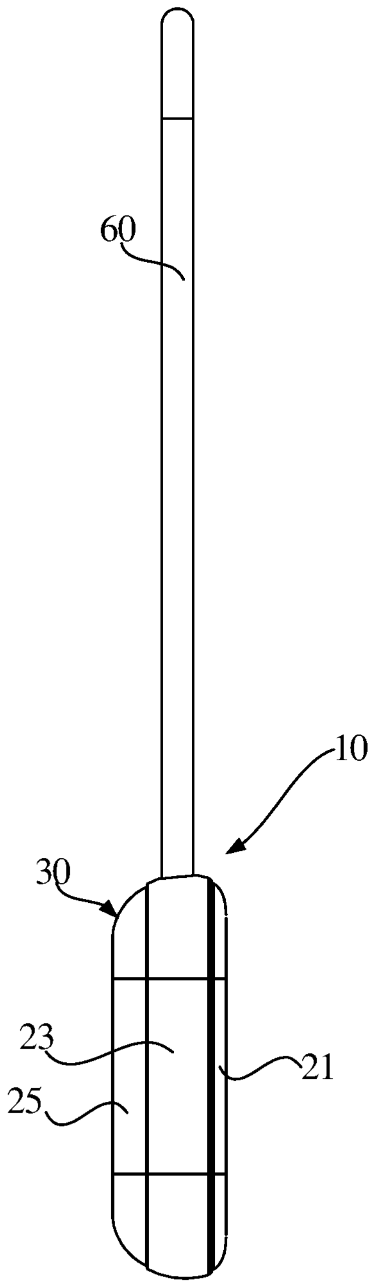
FIG. 2 is a right view of the wearable apparatus in FIG. 1.
Figure 3:
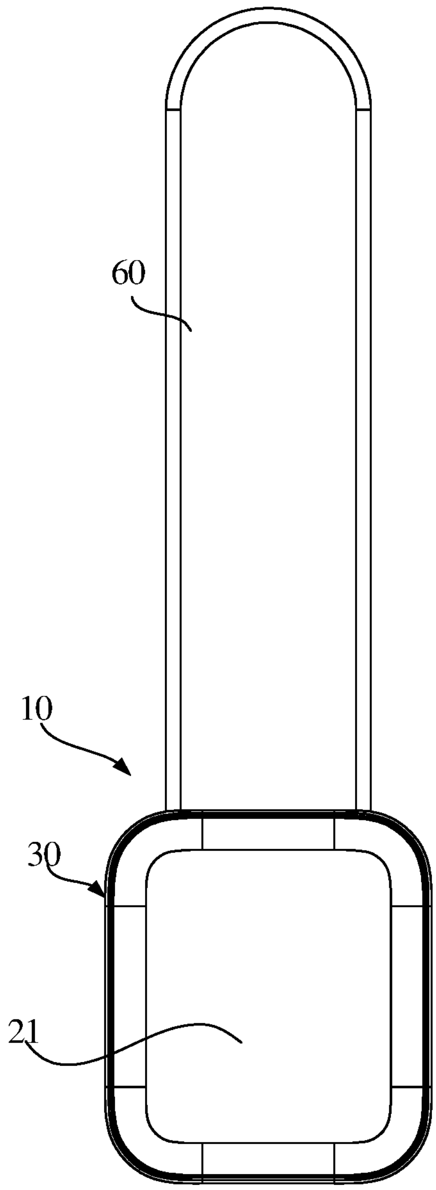
FIG. 3 is a rear view of the wearable apparatus in FIG. 1.

In the following, the technical solutions in the embodiments of the present disclosure will be clearly and completely described with reference to the drawings in the embodiments of the present disclosure. The described embodiments are only a part of the embodiments of the present disclosure, but not all of them. Based on the embodiments of the present disclosure, all other embodiments made by a person of ordinary skill in the art without creative works will fall in the scope of the present disclosure.

The terms 'first', 'second', and 'third' in this disclosure and the like, are used herein for purposes of description, and are not intended to indicate or imply relative importance or significance or to imply the number of indicated technical features. Thus, the feature defined with "first", "second", and the like may include one or more of such a feature. In the description of the present disclosure, it should be noted that, "a plurality of" means two or more, unless specified otherwise. In the description of the present disclosure, unless specifically defined, otherwise, the term 'a plurality of means at least two, for example, two, three, etc. All directional indicators (such as up, down, left, right, front, back, etc.) in the embodiments of the present disclosure are only used to explain the relative positional relationships, movement situations between components in a specific posture (as shown in the drawings), if the specific posture varies, the directional indications will change accordingly. Furthermore, the terms 'include' and 'comprise', and any variations thereof are intended to cover non-exclusive inclusion. For example, a process, method, system, product, or apparatus containing a series of steps or units are not limited to the listed steps or units, but optionally further includes steps or units not listed, or optionally further contain other steps or units inherent to these processes, methods, products or apparatuses.

"Embodiment" mentioned herein indicates at least one embodiment, which combines specific features, structures or properties as described in the embodiment and are within the scope of the present disclosure. The "embodiment" occurred at various parts of the specification may not refer to a same embodiment, and may not refer to an independent or a backup embodiment, which is exclusive from other embodiments. Skilled in the art should explicitly and implicitly understand that the embodiments described in the present disclosure may associate with other embodiments.

According to one aspect of the present disclosure, a connector may be provided. The connector may be configured to connect with an electronic apparatus. The connector may include: a main body and a mating member connected to the main body. An inclined face may be provided on one end of the mating member away from the main body, and a recess may be defined between the inclined face and the main body. The mating member may be configured to be inserted into a mating site of the electronic apparatus; the inclined face may be configured to push an engaging member of the electronic apparatus to move on the inclined face while the mating member is being inserted into the mating site; when the mating member is inserted into the mating site and arrives at a predefined location, the engaging member may be restored and accommodated in the recess to connect the connector and the electronic apparatus by snap-fit.

In some embodiments, the inclined face may be a planar face.

In some embodiments, an angle between the inclined face and a direction in which the mating member is inserted into the electronic apparatus may be in a range from 30° to 45°. In some embodiments, the angle may be 45°.

In some embodiments, the inclined face may be a curved face.

In some embodiments, the mating member may include a side face, the side face may include a first end connected to the main body and a second end away from the main body, the second end may be connected with the inclined face.

In some embodiments, a vertical projection of the side face on the main body may have an outer contour of circular shape, racetrack shape or polygonal shape.

In some embodiments, the mating member may further include an end face away from the main body, the end face may be connected to the second end of the side face and the inclined face.

In some embodiments, the end face may be a planar face or a curved face.

In some embodiments, a vertical projection of the side face on the main body may have a first outer contour, a vertical projection of the end face on the main body may have a second outer contour, the second outer contour may be completely within the first outer contour.

In some embodiments, the second outer contour and the first outer contour may be spaced apart from each other; the mating member may further include a connection face, the end face may be connected to the second end of the side face by the connection face.

In some embodiments, the connection face may be a curved face to form a smooth transition between the side face and the end face; or the connection face may be a planar face.

In some embodiments, the recess may be a groove, the groove and the inclined face may be provided on a same side of the mating member.

In some embodiments, a direction in which the mating member is inserted into the electronic apparatus may be a first direction, a moving direction of the engaging member may be a second direction, and a direction perpendicular to the first direction and the second direction may be defined as a third direction; the groove may penetrate through the side face of the mating member in the third direction.

In some embodiments, the groove may include a first inner wall, a second inner wall and a third inner wall, the second inner wall may be connected between the first inner wall and the third inner wall; the third inner wall may be closer to the inclined face than the first inner wall; an angle between the second inner wall and the third inner wall may be less than or equal to 90°.

In some embodiments, the recess may be a through hole, an opening of the through hole and the inclined face may be on a same side of the mating member.

In some embodiments, the recess and the inclined face may be spaced apart from each other.

In some embodiments, the recess and the inclined face may be connected by a planar face or a curved face therebetween.

In some embodiments, the recess and the main body may be spaced apart from each other.

In some embodiments, the connector may be inserted into the electronic apparatus in a first direction, the inclined face may push the engaging member to move along a second direction; the first direction and the second direction may be perpendicular to each other.

In some embodiments, the main body may have an elongated plate shape, the number of the mating member may be two, the two mating members may be provided on a same side of the main body, and the direction of the two mating members may be the same.

In some embodiments, the two mating members may be spaced apart from each other.

According to another aspect of the present disclosure, a strap is provided. The strap may include the connector described above and a trap body. The strap may be connected to the main body of the connector.

According to a further aspect of the present disclosure, a wearable apparatus is provided. The apparatus may include: an electronic apparatus, a connector, and a strap body. The electronic apparatus may include a housing defining a mounting groove, and an engaging member arranged in the mounting groove and capable of moving relative to the housing. The connector may include a main body and a mating member connected on the main body. An inclined face may be provided on an end of the mating member away from the main body, a recess may be defined between the main body and the inclined face. The mating member may be configured to be inserted into the mounting groove; the inclined face may be configured to push the engaging member to move on the inclined face while the mating member is being inserted into the mounting groove. When the mating member is inserted into the mating site and arrives at a predefined location, the engaging member may be restored and accommodated in the recess to connect the connector and the electronic apparatus by snap-fit. The strap body may be connected to the connector, such that the strap body may be connected to the electronic apparatus by the connector.

According to a further aspect of the present disclosure, a housing assembly is provided. The housing assembly may be applied to an electronic apparatus and configured to connect with a connector, wherein, the housing assembly may include: a housing, defining a mounting groove; and an engaging member, arranged in the mounting groove and capable of moving relative to the housing, wherein the engaging member may be configured to move to provide an avoidance space for the connector to be inserted into or removed from the mounting groove; during the movement of the connector from a first position to a second position in the mounting groove, the engaging member may be configured to move within a limited position and restore to engage with the connector to connect the connector to the housing.

In some embodiments, the engaging member may be configured to move by pressing or pulling.

In some embodiments, the housing assembly may further include a restoration member, wherein the restoration member may be arranged between the engaging member and the housing, the restoration member may be configured to drive the engaging member to restore after the engaging member moves.

In some embodiments, the movement of the engaging member may be a linear movement, the moving direction of the engaging member may be different from the inserting direction or removing direction of the connector.

In some embodiments, the moving direction of the engaging member may be perpendicular to the inserting direction or removing direction of the connector.

In some embodiments, when the connector is inserted into the mounting groove, the engaging member may move due to the pushing force generated by an inclined face on the connector.

In some embodiments, an inclined face may be provided on the engaging member, the inclined face on the engaging member may match the inclined face on the connector.

In some embodiments, the mounting groove may include a first mounting groove and a second mounting groove connecting with each other, the first mounting groove may have a first opening and the second mounting groove may have a second opening.

In some embodiments, the housing may include a plurality of side faces connected to each other, the first opening may be defined in one of the side faces, and the second opening may be defined in an adjacent side face of the housing.

In some embodiments, the first mounting groove may have a bottom wall opposite to the first opening and a groove wall extending in a direction from the first opening to the bottom wall, the connector may be inserted into the first mounting groove along an extending direction of the groove wall.

In some embodiments, the engaging member may include an engaging portion and a pressing portion connected to each other. The pressing portion may be disposed in the second mounting groove and exposed to the second opening, and the engaging portion may be disposed in the first mounting groove, and configured to confine the engaging portion in the first mounting groove and to engage with the connector.

In some embodiments, the engaging member may include a pressing portion, a first engaging portion and a second engaging portion connected successively; at least a part of the pressing portion may be disposed in the second mounting groove, and the pressing portion may be exposed to the second opening; the first engaging portion may be disposed in the first mounting groove, configured to confine the first engaging portion and the second engaging portion in the first mounting groove by an engagement between the first engaging portion and the housing; the second engaging portion may be configured to engage with the connector.

In some embodiments, in a direction perpendicular to an extending direction of the second mounting groove, a width of the first engaging portion may be larger than a width of the second mounting groove to confine the first engaging portion in the first mounting groove.

In some embodiments, a recess may be defined in the connector; the second engaging portion may be a bar, the bar may have a width larger than that of the first engaging portion, the bar may be configured to be received in the recess to engage with the connector.

In some embodiments, an inclined face matching an inclined face on the connector may be provided on the bar, the inclined face on the bar may face the first opening.

In some embodiments, the first engaging portion and the second engaging portion may be integrated structure, the pressing portion and the first engaging portion may be fixed to each other by a buckle.

In some embodiments, a pressing cap may be provided on an end of the pressing portion away from the first engaging portion, a width of the pressing cap may be larger than a width of the pressing portion, each side of the pressing cap may be provided with at least one pillar extending towards the first engaging portion; the housing assembly may further include elastic members configured to drive the engaging member to restore, wherein each of the elastic members may be sleeved on a corresponding pillar, one end of each of the elastic members may be connected to the engaging member, and the other end of each of the elastic members may be connected to the housing.

In some embodiments, an outer face of the pressing cap may be flush with an outer face of the housing.

In some embodiments, the housing assembly may further include an elastic member configured to drive the engaging member to restore, wherein one end of the elastic member may be connected to a side of the second engaging portion away from the first engaging portion, the other end of the elastic member may be connected to the groove wall of the first mounting groove.

In some embodiments, the housing may define a sink, the first opening may be defined by a bottom wall of the sink; the housing assembly may further include a baffle whose shape may match the shape of the sink; the baffle may be mounted in the sink, the baffle may define a through hole through which the connector may pass.

In some embodiments, a thickness of the baffle may be less than a depth of the sink, and an accommodating space may be formed at a side of the baffle away from the bottom wall of the sink, the accommodating space may be configured to accommodate a part of the connector.

According to a further aspect of the present disclosure, an electronic apparatus is provided. The electronic apparatus may include: the housing assembly mentioned above and an electronic component. The electronic component may be disposed in the housing.

According to a further aspect of the present disclosure, a wearable apparatus is provided. The wearable apparatus may include: an electronic apparatus, a connector and a strap body. The electronic apparatus may include: a housing defining a mounting groove; and an engaging member arranged in the mounting groove, and capable of moving relative to the housing. The connector may be configured to be inserted into the mounting groove, when the connector is inserted into or removed from the mounting groove, the engaging member may be configured to move to provide an avoidance space for the connector, during the movement of the connector from a first position to a second position, the engaging member may be configured to move within a limited position and restore to engage with the connector to connect the connector to the housing; and a strap body, wherein the strap body may be connected to the connector to connect the connector to the electronic apparatus.

According to a further aspect of the present disclosure, a wearable apparatus may be provided. The wearable apparatus may include: an electronic apparatus, a connector, and a strap body. The electronic apparatus may include a housing defining a mounting groove, and an engaging member arranged in the mounting groove and capable of moving relative to the housing. The connector may include a main body and a mating member connected on the main body. An inclined face may be provided on an end of the mating member away from the main body, a recess may be defined between the main body and the inclined face. The mating member may be configured to be inserted into the mounting groove; the inclined face may be configured to push the engaging member to move on the inclined face while the mating member is being inserted into the mounting groove. When the mating member is inserted into the mating site and arrives at a predefined location, the engaging member may be restored and accommodated in the recess to connect the connector and the electronic apparatus by snap-fit. The strap body may be connected to the connector, such that the strap body may be connected to the electronic apparatus by the connector.

According to a further aspect of the present disclosure, an assembly method for the above wearable apparatus may include: inserting the mating member to a first position in the mounting groove of the housing, wherein when the mating member is at the first position, the inclined face of the mating member abuts against the engaging member; inserting the mating member towards a second position in the mounting groove, and the inclined face of the mating member pushing the engaging member to move on the inclined face of the mating member, to provide an avoidance space for the mating member to be inserted into the mounting groove; and restoring the engaging member to be accommodated in the recess when the mating member is inserted into the second portion in the mounting groove, and connecting the connector and the housing assembly through an engagement between the engaging member and the mating member.

According to one aspect of the present disclosure, a method for assembling a housing assembly and a connector is provided, wherein the housing assembly and the connector may be applied to a wearable apparatus, the housing assembly may include a housing and an engaging member, the housing may be provided with a mounting groove, the engaging member may be arranged in the mounting groove; the connector may include a mating member; an inclined face may be provided on the mating member, the inclined face may be provided on an end of the connector, a recess may be defined on the mating member and between the inclined face and the other end of the mating member; wherein the method may include: inserting the mating member to a first position in the mounting groove of the housing assembly, wherein when the mating member is at the first position, the inclined face of the mating member may abut against the engaging member; inserting the mating member towards a second position in the mounting groove, and the inclined face of the mating member pushing the engaging member to move on the inclined face of the mating member, to provide an avoidance space for the mating member to be inserted into the mounting groove; and restoring the engaging member to be accommodated in the recess when the mating member is inserted into the second portion in the mounting groove, and connecting the connector and the housing assembly by snap-fit.

In some embodiments, an inclined face may be provided on the engaging member, the inclined face of the engaging member may match the inclined face of the connector; in the inserting the mating member to a first position in the mounting groove of the housing assembly, wherein the inclined face of the mating member may abut against the engaging member, the inclined face of the connector may abut against the inclined face of the engaging member; and in the inserting the mating member towards a second position in the mounting groove, and the inclined face of the mating member pushing the engaging member to move on the inclined face of the mating member, the inclined face of the engaging member may move on the inclined face of the mating member.

In some embodiments, in the inserting the mating member towards a second position in the mounting groove, and the inclined face of the mating member pushing the engaging member to move on the inclined face of the mating member, to provide an avoidance space for the mating member to be inserted into the mounting groove, the movement of the engaging member may be a linear movement, a moving direction of the engaging member may be different from a direction in which the connector is inserted into the mounting groove.

In some embodiments, the moving direction of the engaging member may be perpendicular to the direction in which the connector may be inserted into the mounting groove.

In some embodiments, the mounting groove may include a first mounting groove and a second mounting groove connecting with each other, the first mounting groove may include a first opening, a bottom wall opposite to the first opening and a first side wall extending in a direction from the first opening to the bottom wall, in the inserting the mating member to a first position in the mounting groove of the housing assembly and inserting the mating member towards a second position in the mounting groove, inserting the connector to the first position and the second position along an extending direction of the first groove wall.

In some embodiments, the second mounting groove may include a second opening and a second side wall extending in a direction from the second opening to the first mounting groove; in the inserting the mating member towards a second position in the mounting groove, and the inclined face of the mating member pushing the engaging member to move on the inclined face of the mating member, the engaging member may move along the second side wall.

In some embodiments, the housing assembly may include an elastic member, the elastic member may be connected between the engaging member and the housing; in the restoring the engaging member to be accommodated in the recess when the mating member is inserted into the second portion in the mounting groove, and connecting the connector and the housing assembly by snap-fit, the engaging member may be driven to restore by the elastic member.

In some embodiments, the engaging member may include a pressing cap, a first engaging portion and a second engaging portion connected successively, the elastic member may be connected between the pressing cap and the housing; before the inserting the mating member to a first position in the mounting groove of the housing assembly, wherein the inclined face of the mating member may abut against the engaging member, the method further may include: confining the first engaging portion and the second engaging portion in the first mounting groove by the first engaging portion through abutting against the housing; in the inserting the mating member towards a second position in the mounting groove, and the inclined face of the mating member pushing the engaging member to move on the inclined face of the mating member, to provide an avoidance space for the mating member to be inserted into the mounting groove, the second engaging portion may move on the inclined face of the mating member; the pressing portion may squeeze the elastic member towards the housing, such that the elastic member may be compressed; and in the restoring the engaging member to be accommodated in the recess when the mating member is inserted into the second portion in the mounting groove, and connecting the connector and the housing assembly by snap-fit, the elastic member may be restored to drive the engaging member to be restored, to accommodate the second engaging portion by the recess.

In some embodiments, the engaging member may include a pressing portion and an engaging portion connected successively, an elastic member may be connected between the housing and the engaging portion; before the inserting the mating member to a first position in the mounting groove of the housing assembly, wherein the inclined face of the mating member may abut against the engaging member, the method further may include: confining the engaging portion in the first mounting groove by the engaging portion through matching the housing; in the inserting the mating member towards a second position in the mounting groove, and the inclined face of the mating member pushing the engaging member to move on the inclined face of the mating member, to provide an avoidance space for the mating member to be inserted into the mounting groove, the engaging portion may move on the inclined face of the mating member, and may squeeze the elastic member towards the housing, such that the elastic member may be compressed; and in the restoring the engaging member to be accommodated in the recess when the mating member is inserted into the second portion in the mounting groove, and connecting the connector and the housing assembly by snap-fit, the elastic member may be restored to drive the engaging member to restore, such that the engaging member may be accommodated in the recess.

In some embodiments, the recess and the inclined face of the mating member may be connected by a transition face; after the inserting the mating member towards a second position in the mounting groove, and the inclined face of the mating member pushing the engaging member to move on the inclined face of the mating member, to provide an avoidance space for the mating member to be inserted into the mounting groove, the method further may include: abutting against the engaging member by the transition face until the mating member arrives the second position.

According to another aspect of the present disclosure, a method for disassembling a housing assembly and a connector is provided, wherein the housing assembly and the connector may be applied to a wearable apparatus; the housing assembly may include a housing and an engaging member, the housing may be provided with a mounting groove, the engaging member may be arranged in the mounting groove; the connector may include a mating member, an inclined face may be provided on an end of the mating member, a recess may be defined on the mating member and between the inclined face and the other end of the mating member; wherein the mating member may be inserted in the mounting groove, the engaging member may be accommodated in the recess, such that the connector may be connected to the housing assembly by snap-fit; the method may include: removing the engaging member from the recess to provide an avoidance space for the mating member; and pulling out the mating member from the mounting groove.

In some embodiments, in the removing the engaging member from the recess to provide an avoidance space for the mating member, removing the engaging member from the recess by pressing or pulling the engaging member.

According to another aspect of the present disclosure, an electronic apparatus may be provided. The electronic apparatus may include a housing assembly and an electronic component. The housing assembly is configured to connect with a connector, and includes a housing and an engaging member. The housing defines a mounting groove. The engaging member is arranged in the mounting groove and capable of moving relative to the housing to engage with the connector or disengage the connector. The electronic component is disposed in the housing. The housing defines a sink. The housing assembly further includes a baffle mounted in the sink. The baffle defines a through hole being configured to let the connector pass therethrough.

In some embodiments, the engaging member is configured to move to provide an avoidance space for the connector to be inserted into or removed from the mounting groove; during the movement of the connector from a first position to a second position in the mounting groove, the engaging member is configured to move within a limited position and to engage with the connector when the connector in the second position.

In some embodiments, the sink defines a sleeve structure surrounding at least an end portion of the baffle.

In some embodiments, the sleeve structure of the sink and the baffle cooperatively define a semi-open accommodating space which has a sleeve structure, and the accommodating space is configured to accommodate a part of the connector.

In some embodiments, the thickness of the baffle is less than the depth of the sink, walls of the sink and an outside face of the baffle define the semi-open accommodating space, and the semi-open accommodating space are configured to conceal at least a part of the connector.6. The electronic apparatus according to claim 1, wherein the mounting groove includes a first mounting groove and a second mounting groove connecting with each other, and the first mounting groove has a first opening and the second mounting groove has a second opening; and the first opening is defined by a bottom wall of the sink, the first opening being configured to let the connector pass therethrough.

In some embodiments, the engaging member is configured to engage with the connector, in the first mounting groove.

In some embodiments, a third opening is defined on the second groove wall of the second mounting groove, the baffle is further disposed at the third opening, and the engaging member is an integrated structure.

In some embodiments, the shape of the baffle matches the shape of the sink.

In some embodiments, the engaging member includes an engaging portion and a pressing portion connected to each other, the pressing portion is disposed in the second mounting groove and exposed to the second opening, and the engaging portion is disposed in the first mounting groove, and configured to confine the engaging portion in the first mounting groove and to engage with the connector.

According to another aspect of the present disclosure, an electronic apparatus is provided. The electronic apparatus may include a housing assembly and an electronic component. The housing assembly is configured to connect with a connector, and includes a housing and an engaging member. The housing defines a mounting groove. The engaging member is arranged in the mounting groove and capable of moving relative to the housing to engage with the connector or disengage the connector. The electronic component is disposed in the housing. The mounting groove includes a first mounting groove and a second mounting groove connecting with each other, and the first mounting groove has a first opening and the second mounting groove has a second opening. The engaging member includes an engaging portion and a pressing portion connected to each other. The engaging portion is configured to be mounted in the first mounting groove through the first opening, and the pressing portion is configured to be mounted in the second mounting groove through the second opening. The engaging member is configured to engage with the connector.

In some embodiments, the engaging member includes a first engaging portion and a second engaging portion connected successively, the first engaging portion is disposed in the first mounting groove, configured to confine the first engaging portion and the second engaging portion in the first mounting groove by an engagement between the first engaging portion and the housing; the second engaging portion is configured to engage with the connector.

In some embodiments, in a direction perpendicular to an extending direction of the second mounting groove, a width of the first engaging portion is larger than a width of the second mounting groove to confine the first engaging portion in the first mounting groove.

In some embodiments, the housing defines a sink, and the first opening is defined by a bottom wall of the sink; and the housing assembly further includes a baffle; the baffle is mounted in the sink, and the baffle defines a through hole which the connector passes.

In some embodiments, the baffle includes a first face and a second face disposed opposite to each other, the first face faces the first mounting groove and is configured to confine the engaging portion in the first mounting groove, the baffle defines a through hole penetrating through the first face and the second face, and the through hole connects with the first opening.

In some embodiments, the shape of the baffle matches the shape of the sink; the sink defines a sleeve structure surrounding at least an end portion of the baffle, the sleeve structure of the sink and the baffle cooperatively define a semi-open accommodating space which has a sleeve structure; and the semi-open accommodating space is configured to conceal at least a part of the connector.

According to another aspect of the present disclosure, a wearable apparatus is provided. The wearable apparatus may include an electronic apparatus, a connector, and a strap body. The electronic apparatus may include a connector, a strap body, and an electronic apparatus. The strap body is connected to the connector. The electronic apparatus includes a housing assembly. The housing assembly is configured to connect with the connector, and includes: a housing, configured to accommodate an electronic component, the housing defining a mounting groove; an engaging member, arranged in the mounting groove and capable of moving relative to the housing to engage with the connector or disengage the connector; and a baffle being coupled to the housing, wherein the baffle defines a through hole being configured to let the connector pass therethrough.

In some embodiments, the connector including a mating member, the mating member defining a recess; the mating member is configured to pass the through hole to be inserted into or exit from the electronic apparatus; and the engaging member is configured to be accommodated in the recess to engage with the connector.

In some embodiments, the housing defines a sink, the baffle is mounted in the sink, wherein the shape of the baffle matches the shape of the sink; the sink and the baffle cooperatively define a semi-open accommodating space which has a sleeve structure, and the accommodating space is configured to accommodate a part of the strap body.

In some embodiments, the width of the recess in a direction in which the mating member is inserted into the electronic apparatus is less than the thickness of the middle portion of the baffle.

A wearable apparatus of the present disclosure may be a smart watch, a bracelet, a headband and the like. The smart watch is taken as an example to illustrate the present disclosure.

Referring to FIGS. 1-5, the wearable apparatus 10 may include an electronic apparatus 30 and a strap 50 connected to the electronic apparatus 30.

Figure 5:
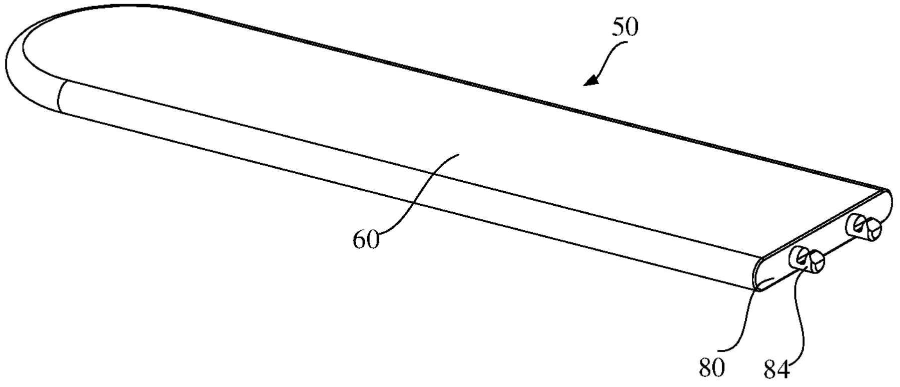
FIG. 5 is a schematic perspective view of a strap in some embodiments of the present disclosure.
Figure 6:
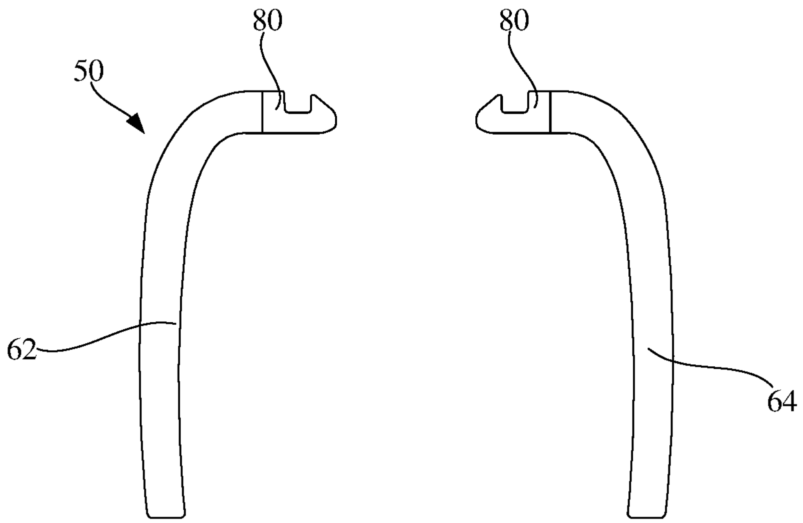
FIG. 6 is a schematic side view of a strap according to some embodiments of the present disclosure.
Figure 7:
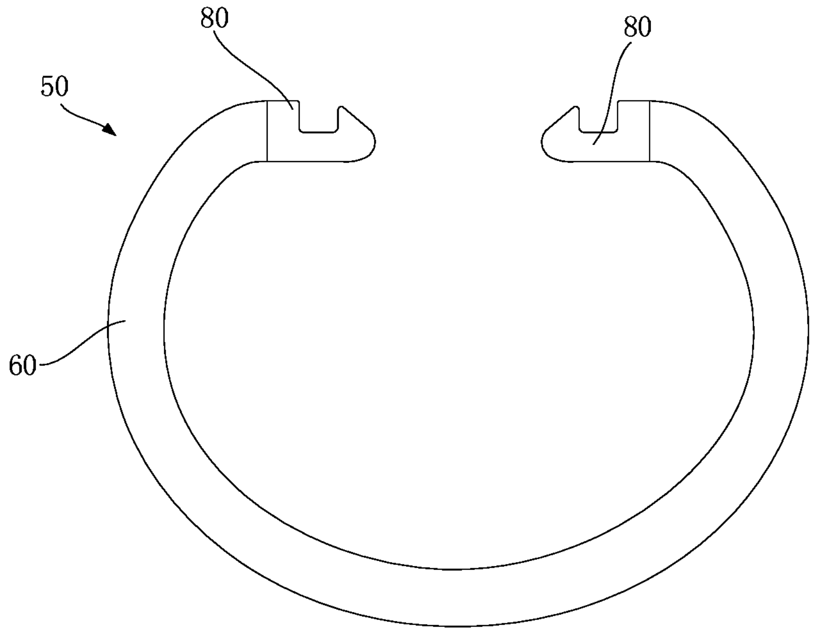
FIG. 7 is a schematic side view of a strap according to some embodiments of the present disclosure.

Specifically, as shown in FIGS. 5-7, the strap 50 may include a strap body 60 and a connector 80. The strap body 60 may be connected to the connector 80, the connector 80 is configured to connect with the electronic apparatus 30, so as to connect the strap body 60 to the electronic apparatus 30.

The strap body 60 may be a strap for binding the electronic apparatus 30 to a person's wrist, arm, waist, or the like, or may be a strap for hanging around the person's neck or the like. The material of the strap body 60 may be natural cloth, chemical fiber, leather, metal, or the like. The strap body 60 may be provided with a mechanism for adjusting the length of the strap body 60.

In some embodiments, the strap body 60 may be an integrated structure, two ends of the strap body 60 are respectively connected to two connectors 80 as shown in FIG. 7. In other embodiments, as shown in FIG. 6, the strap body 60 may have a segmented structure, that is, the strap body 60 includes a first strap body 62 and a second strap body 64, one end of the first strap body 62 and one end of the second strap body 64 are respectively connected to two connectors 80, the other ends of the first strap body 62 and the second strap body 64 may be connected by a detachable mechanism.

The connector 80 could be connected to the electronic apparatus 30. For example, both the connectors 80 are connected to the strap body 60 and connected to the electronic apparatus 30 respectively, for example, connected to the opposite ends of the electronic apparatus 30, so as to connect the strap body 60 and the electronic apparatus 30 together.

Figure 8:
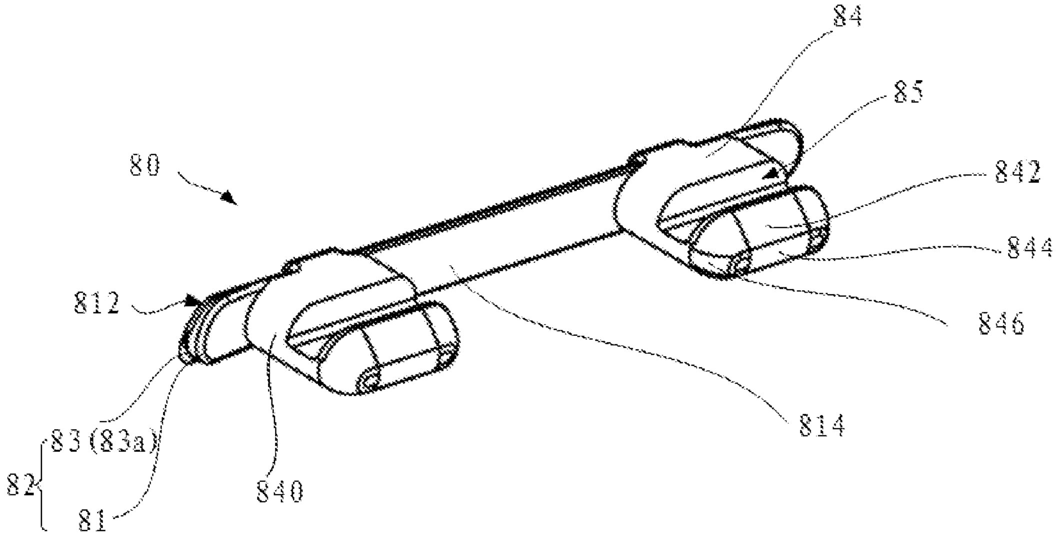
FIG. 8 is a schematic view of a connector according to some embodiments of the present disclosure from one perspective.
Figure 9:
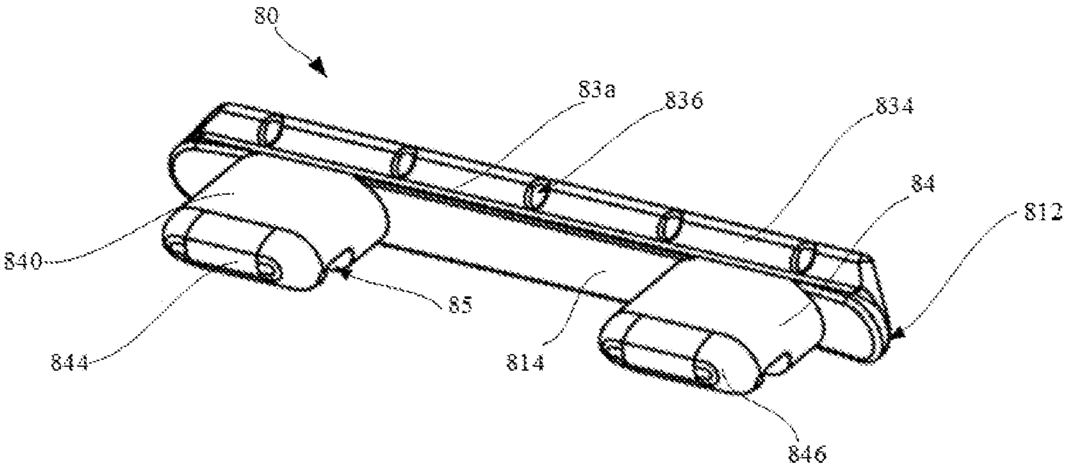
FIG. 9 is a schematic view of the connector of FIG. 8 from another perspective.
Figure 10:
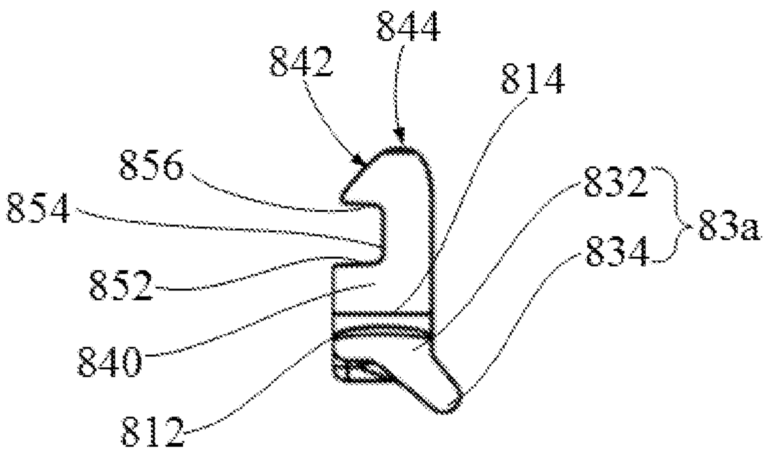
FIG. 10 is a side view of the connector of FIG. 8.

The connector 80 may be made of materials such as metal, plastic or the like. As shown in FIGS. 8-10, the connector 80 may include a main body 82 and a mating member 84 connected to the main body 82.

The main body 82 and the mating member 84 may be made of same materials or may be made of different materials. In some embodiments, the main body 82 and the mating member 84 may be an integrated structure. In some embodiments, the main body 82 and the mating member 84 may be separate components, and may be connected by welding, bonding, snap-fit, or the like.

Specifically, as shown in FIG. 8, the main body 82 has a substantially elongated plate shape. Of course, in other embodiments, the main body 82 may have other shapes, which is not limited in this disclosure.

The strap body 60 is connected to the main body 82. Specifically, the main body 82 includes a first connection portion 81 and a second connection portion 83 connected to each other. The mating member 84 is connected to the first connection portion 81, and the strap body 60 is connected to the second connection portion 83.

The first connection portion 81 may be generally a thin plate. For example, an outer contour of the first connection portion 81 may have a racetrack shape, a rectangular shape or the like. The first connection portion 81 includes a first connection face 812 and a second connection face 814 which are oppositely disposed. The first connection face 812 and the second connection face 814 may both be planar.

A second connection portion 83 may be provided on the first connection face 812. In some embodiments, the second connection portion 83 may substantially have a plate shape, a frame shape or other shapes. In the following, the second connection portion 83 (for example, 83_a_, 83_b_, and 83_c_) is illustrated through three examples. It will be noted that, the second connection portion 83 of the present disclosure is not limited to the following three structures.

For example, as shown in FIGS. 8-10, the second connection portion 83_a_ includes a connection seat 832 and an extending portion 834. The connection seat 832 is connected to the first connection face 812, the extending portion 834 extends from the side of the connection seat away from the first connection face 812 towards a direction away from the first connection face 812. In this embodiment, the extending portion 834 extends from part area of the connection seat 832, and the extending portion 832 is inclined with respect to the first connection face 812, so that when the user wears the wearable apparatus 10, the strap body 60 connected on the extending portion 834 is guided towards the user's body.

Figure 11:
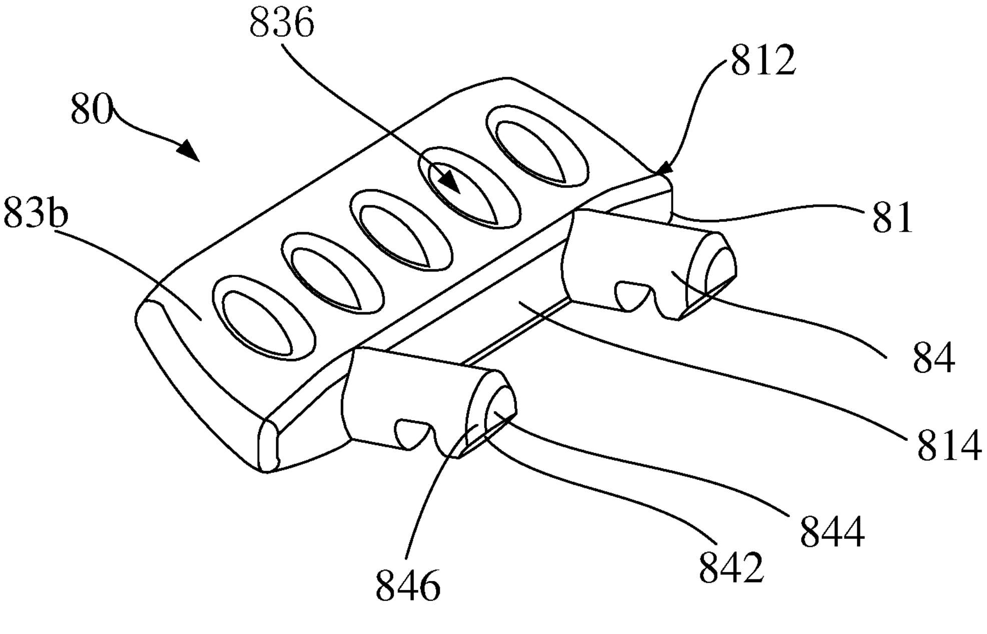
FIG. 11 is a schematic view of a connector according to some embodiments of the present disclosure from one perspective.
Figure 12:
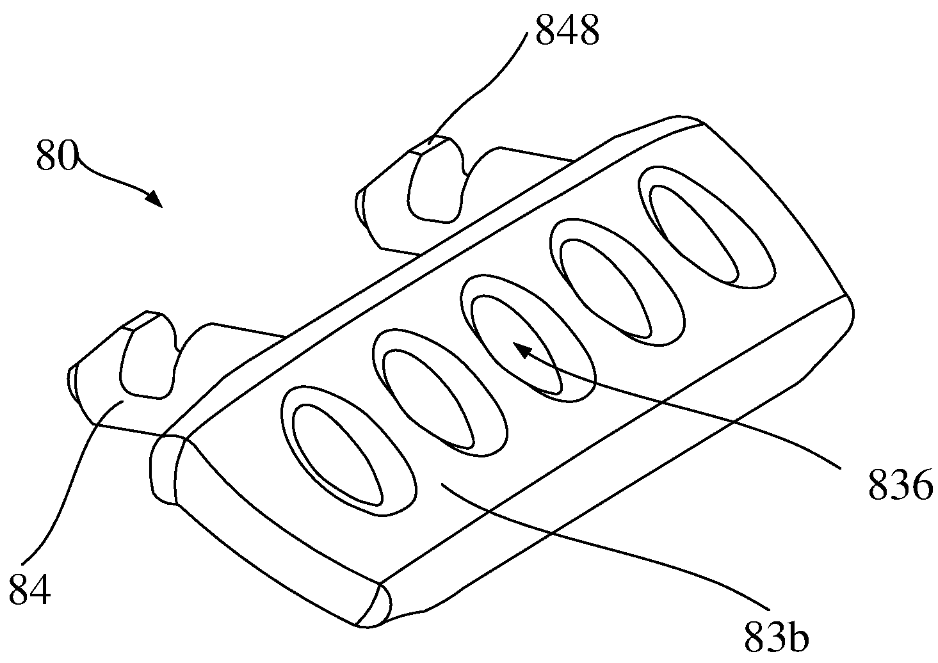
FIG. 12 is a schematic view of the connector of FIG. 11 from another perspective.
Figure 13:
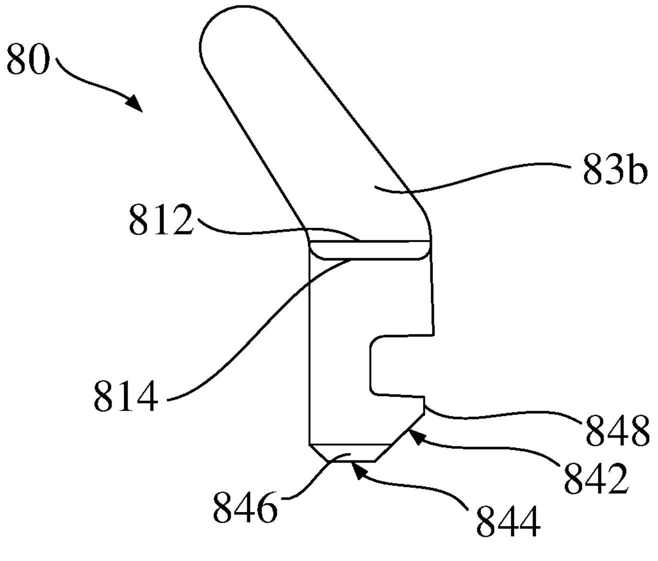
FIG. 13 is a side view of the connector of FIG. 11.

As shown in FIGS. 11-13, the second connection portion 83*b* is generally in the shape of a plate, and is disposed obliquely with respect to the first connection face 812, so that when the user wears the wearable apparatus 10, the strap body 60 connected to the extending portion 834 is guided towards the user's body. In a direction away from the first connection face 812, the thickness of the plate-like second connection portion 83*b* gradually decreases from the first connection face 812.

Figure 14:
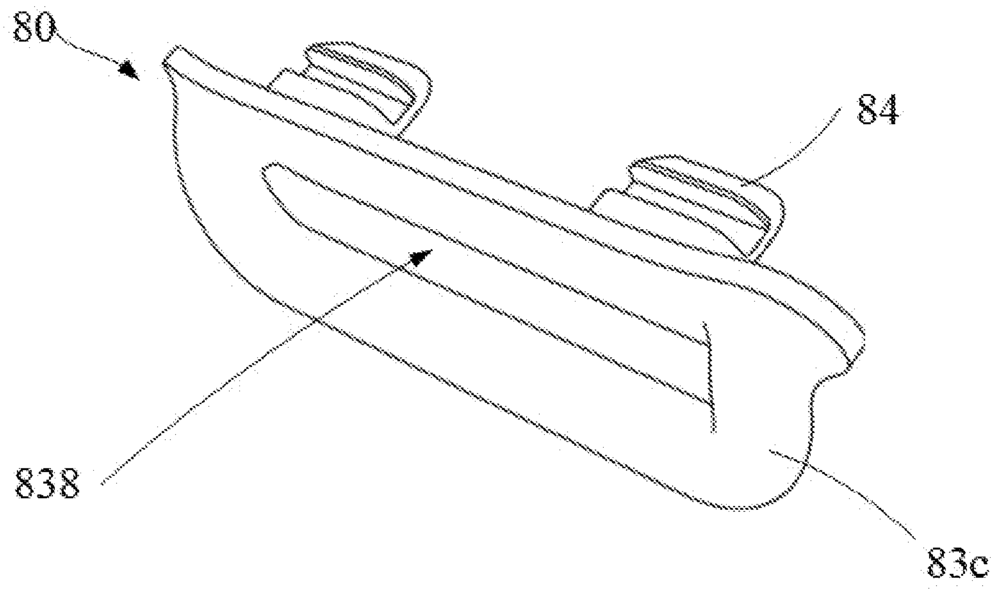
FIG. 14 is a schematic view of a connector according to some embodiments of the present disclosure from one perspective.
Figure 15:
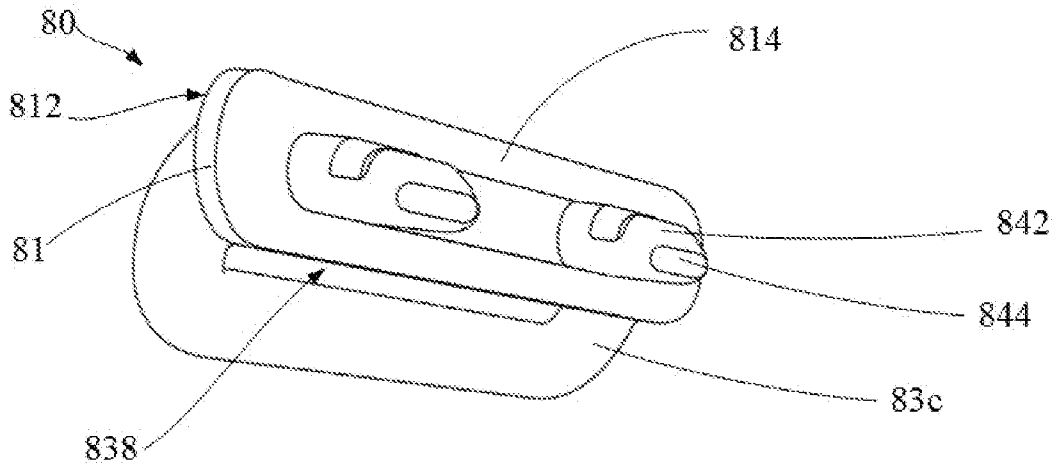
FIG. 15 is a schematic view of the connector of FIG. 14 from another perspective.
Figure 16:
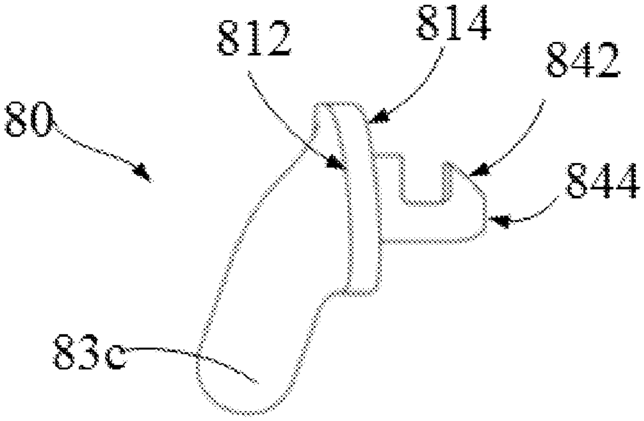
FIG. 16 is a side view of the connector of FIG. 14.

As shown in FIGS. 14-16, the second connection portion 83*c* is in the shape of a frame as a whole, and the frame is disposed obliquely with respect to the first connection face 812, so that when the user wears the wearable apparatus 10, the strap body 60 connected to the extending portion 834 is guided towards the user's body.

Figure 4:
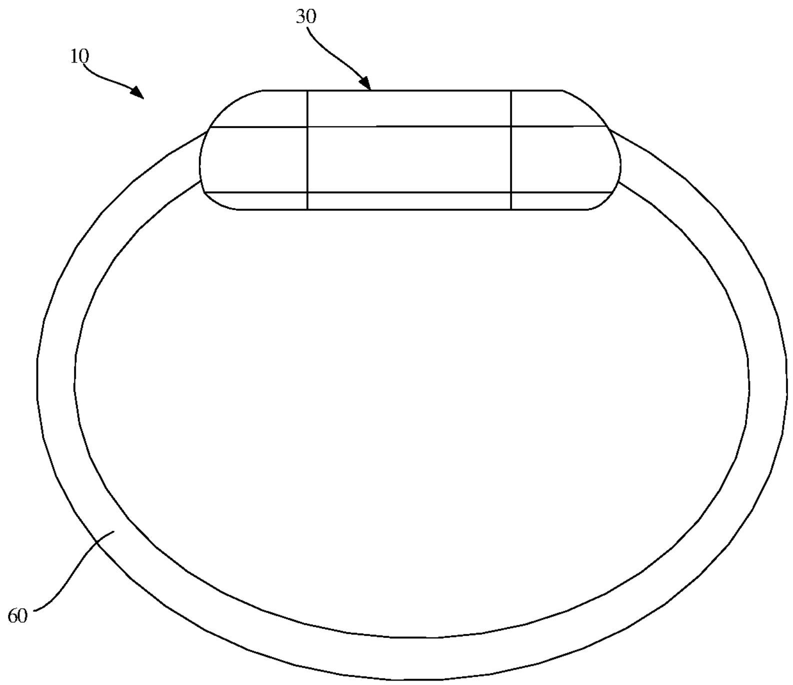
FIG. 4 is a side view of a wearable apparatus according to some embodiments of the present disclosure.

In the above embodiments, the second connection portion 83 may guide the strap body 60 towards the user's body when the user wears the wearable apparatus 10, so that the strap body 60 extends along the contour of the user's body (for example, the user's wrist) to avoid an excessively large gap between the strap body 60 and the human body. In this way, the wearing wearable apparatus 10 closely fits the human body, and assists to bind the wearable apparatus 10 to the human body securely, as shown in FIGS. 4 and 7. It will be noted that, in other embodiments, the second connection portion 83*b* may also extend in a direction perpendicular to the first connection face 812. In this situation, the extending direction of the strap body 60 is also perpendicular to the first connection face 812, as shown in FIG. 5.

In the above embodiments, an end face of the second connection portion 83 (83*a*, 83*b*, 83*c*) away from the first connection face 812 are smoothly curved faces, which could protect the strap body 60 from being damaged by a sharp end, and protect human bodies from being harmed by the sharp end. The connection between the second connection portion 83 (83*a*, 83*b*, 83*c*) may transition to the first connection portion 81 smoothly, thereby reducing stress concentration, making the structures more durable, and preventing harms to human bodies.

The second connection portion 83 is provided with a connection structure for connection with the strap body 60. In some embodiments, the connection structures may be through holes 836 defined in the second connection portion 83, as shown in FIGS. 9 and 11-12. The second connection portions 83*a* and 83*b* define a number of through holes 836. These through holes may be configured to connect with the strap body 60 during the molding or pressing manufacturing processes. In some embodiments, as shown in FIGS. 14-15, the connection structure may be a through groove 838 defined in the second connection portion 83*c*, the strap body 60 may pass through the through groove 838 and wind around the second connection portion 83*c*. As a result, the strap body 60 could be connected to the second connection portion 83*c*.

The mating member 84 is fixed on the second connection face 814 of the first connection portion 81. The mating member 84 is configured to be inserted into the electronic apparatus 30 in a first direction, to cooperatively connect with a mating site of the electronic apparatus 30, so as to connect the strap body 60 to the electronic apparatus 30. The connector 80 shown in FIG. 8, FIG. 11 and FIG. 14 has two mating members 84. In other embodiments, there could be one or more than two mating member(s) 84. When there is a number of mating members 84, the mating members 84 are all disposed on the second connection face 814 and spaced apart from each other along the second connection face 814. The directions of the plurality of mating members 84 are the same. Among them, the spacings between the plurality of mating members 84 may be the same.

Figure 17:
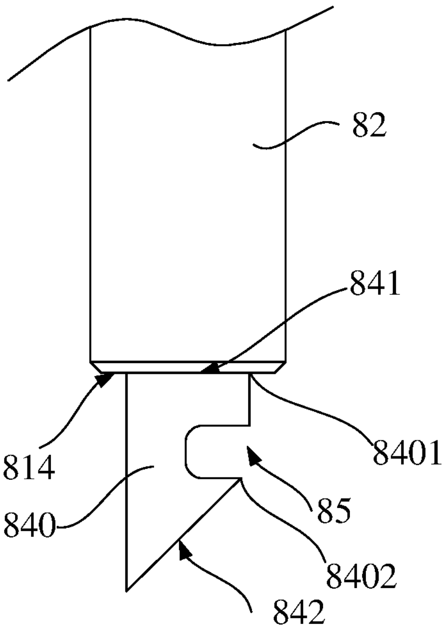
FIG. 17 is a side view of a connector according to some embodiments of the present disclosure.

In some embodiments, as shown in FIG. 17, the mating member 84 may include a side face 840 and an inclined face 842 (also referred to as a first inclined face) disposed at an end away from the main body 82, a recess 85 is defined between the first inclined face 842 and the main body 82.

Figure 18:
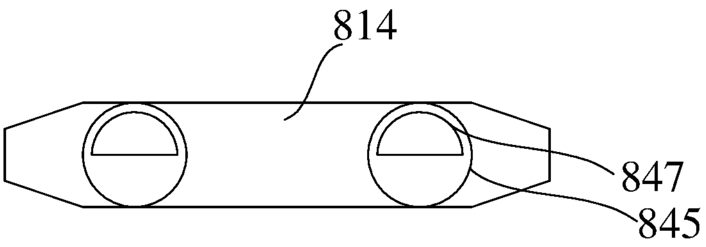
FIG. 18 is a schematic diagram of projections of the end face and the side face of the connector in FIG. 11 onto the second connection face.
Figure 19:
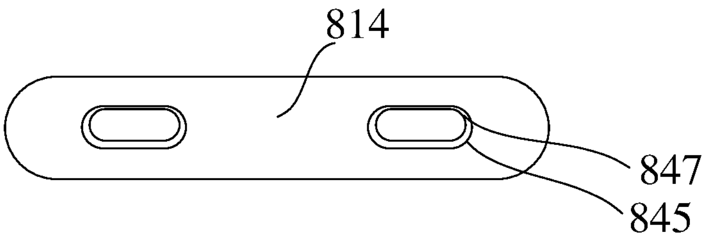
FIG. 19 is a schematic diagram of projections of the end face and the side face of the connector in FIG. 8 onto the second connection face.

Specifically, the side face 840 may extend in a direction perpendicular to the second connection face 814. The side face 840 may include a first end 8401 and a second end 8402. The first end 8401 is connected to the second connection face 814 and the second end 8402 is connected to the first inclined face 842. As shown in FIGS. 18 and 19, a vertical projection of the side face 840 on the second connection face 814 has a first outer contour 845, the first outer contour 845 may have a shape of circular, oval, racetrack, square, or the like. A racetrack may usually be composed of two arcs opposite to each other and two parallel line segments, the two parallel line segments are located between the two arcs and connect the two arcs. Wherein, the vertical projection is the projection in a direction perpendicular to the second connection face 814. As shown in FIGS. 11-12 and 18, if the mating member 84 has a substantially cylindrical shape, then the first outer contour 845 has a circular shape. As shown in FIGS. 8-9 and 19, if the mating member 84 is substantially a flat column, then the first outer contour 845 may have a racetrack shape. It should be noted that, in other embodiments, the side face 840 may also be inclined with respect to the second connection face 814. For example, in a direction from the first end 8401 to the second end 8402, the mating member 84 is substantially cone-shaped as a whole.

The first inclined face 842 may be a planar face or a curved face, and an angle between the first inclined face 842 and the first direction may be 30°-45°, for example, 30°, 35°, 40°, or 45°. The smaller the angle, the smaller the force required to insert the mating member 84 to the electronic apparatus 30. If the angle is too small, then the length of the first inclined face 842 in the first direction will be longer, and the thickness of the mating member 84 at the position of the first inclined face 842 is smaller, which would reduce the strength of the mating member 84; meanwhile, if the angle is too small, the mating member 84 would be sharper, which would damage other parts of the wearable apparatus 10 more easily, or hurt the user. However, if the angle is too large, then the force required to insert the mating member 84 into the electronic apparatus 30 is larger. Within the above angle range, the relationship between the force required to insert the mating member 84, the structural strength of the mating member 84, the maintenance of the wearable apparatus 10, and the user's use safety could be well balanced.

In some embodiments, as shown in FIGS. 8-16 and 20, the mating member 84 further includes an end face 844 away from the second connection face 814. Specifically, the end face 844 is opposite to the second connection face 814, and the end face 844 is connected to the second end 8402 of the side face 840 and the first inclined face 842. The end face 844 may be a planar face, as shown in FIGS. 11-16 and 20. Of course, the end face 844 may also be a curved face, so that there is a smooth transition between the end face 844 and the side face 840, as shown in FIGS. 8-10, so that the operation of inserting the mating member 94 into the mating site of the electronic apparatus 30 could be smoother and more convenient. A vertical projection of the end face 844 on the second connection face 814 has a second outer contour 847, the second outer contour 847 may have a sector shape, as shown in FIGS. 11 and 18, or may have a racetrack shape, as shown in FIGS. 8-9 and 19. It will be noted that, the second outer contour 847 may also be circular, oval, or other shapes, which are not limited in the present disclosure. Wherein, the second outer contour 847 may be completely within the first outer contour 845.

In the embodiments shown in FIGS. 8-13, the end portion of the mating member 84 away from the main body 82 is generally tapered, that is, the cross-sectional area of the end portion of the mating member 84 away from the main body 82 gradually decreases in the direction away from the main body 82, thereby making it easier to insert the mating member 84 into the electronic apparatus 30. The end face of the mating member 84 is connected to the second end 8402 of the side face 840 through a connection face 846. In this situation, the second outer contour 847 and the first outer contour 845 are spaced apart from each other, as shown in FIGS. 18 and 19. The connection face 846 may be a curved face, so that the side face 840 and the end face 844 transit smoothly, as shown in FIGS. 8-9. As a result, the mating member 84 could move more smoothly when being inserted into the mounting groove 232, and the colliding abrasion between the engaging member 24 and the mating member 84 could be reduced. It will be noted that, the connection face 846 may also be a planar face, as shown in FIGS. 11-13.

Figure 20:
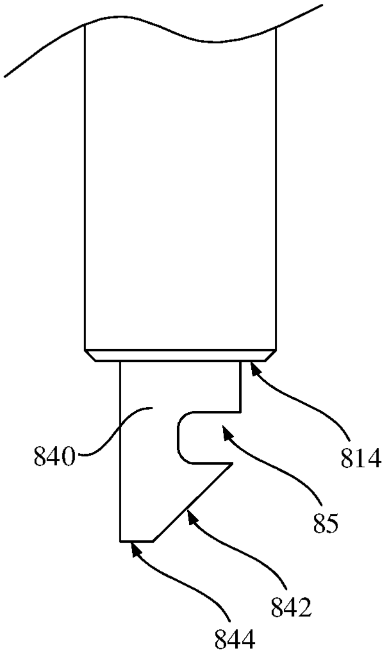
FIG. 20 is a side view of a connector according to some embodiments of the present disclosure.
Figure 21:
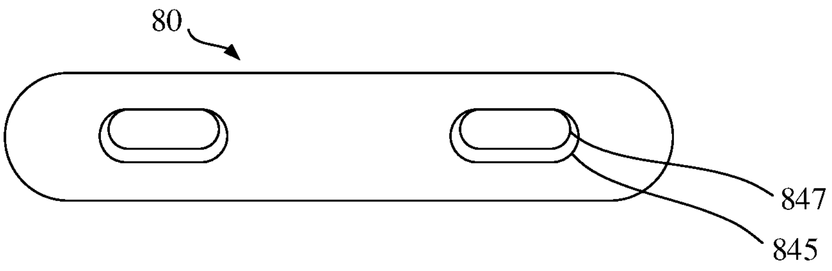
FIG. 21 is a schematic diagram of projections of the end face and the side face of the connector in FIG. 20 onto the second connection face.

In some embodiments, a part of the second outer contour 847 overlaps a part of the first outer contour 845, other parts of the second outer contour 847 and the first outer contour 845 are spaced apart from each other, as shown in FIGS. 20 and 21.

As shown in FIGS. 8-16, a recess 85 is defined on the side face of the mating member 84 for cooperating with the electronic apparatus 30. The opening of the recess 85 is located on the same side of the mating member 84 as the first inclined face 842.

The recess 85 may be a groove, so that it is easy to machine the recess 85 and the mating member 84 has a relatively high strength. In some embodiments, in a direction parallel to the second connection face 814, the groove penetrates through the side face 840 of the mating member 84. As shown in FIG. 10, the groove has a first inner wall 852 and a third inner wall 856 opposite to each other, and a second inner wall 854 connected between the first inner wall 852 and the third inner wall 856. The third inner wall 856 is closer to the first inclined face 842 than the first inner wall 852. An angle between the second inner wall 854 and the third inner wall 856 may be equal to or less than 90°, for example, 70° to 90°, 85° to 90°, so that the cooperation between the groove and the electronic apparatus 30 is more reliable, and the connection between the connector 80 and the electronic apparatus 30 is more stable.

Figure 22:
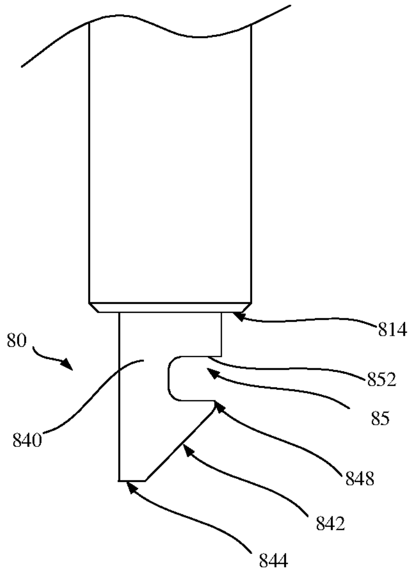
FIG. 22 is a side view of a connector according to some embodiments of the present disclosure.
Figure 23:
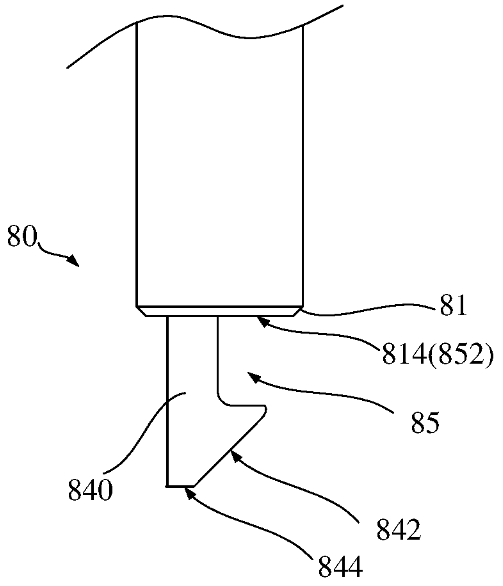
FIG. 23 is a side view of a connector according to some embodiments of the present disclosure.

As shown in FIG. 17, the recess 85 may be disposed adjacent to the first inclined face 842, that is, the third inner wall 856 of the recess 85 is directly connected to the first inclined face 842. As shown in FIGS. 12, 13 and 22, the recess 85 and the first inclined face 842 may also be spaced apart from each other, that is, the recess 85 and the first inclined face 842 are connected by a transition face 848 therebetween, the transition face 848 may be a planar face or a curved face. In some embodiments, the recess 85 are spaced apart from the main body 82, that is, the side face 840 of the mating member 84 extends to a location between the first inner wall 852 of the recess 85 and the second connection face 814, as shown in FIGS. 8-17 and FIG. 20, 22. In some embodiments, the recess 85 extends to the first end 8401 of the side face 840. At this time, the second connection face 814 serves as the first inner wall 852 of the recess 85, as shown in FIG. 23.

Figure 24:
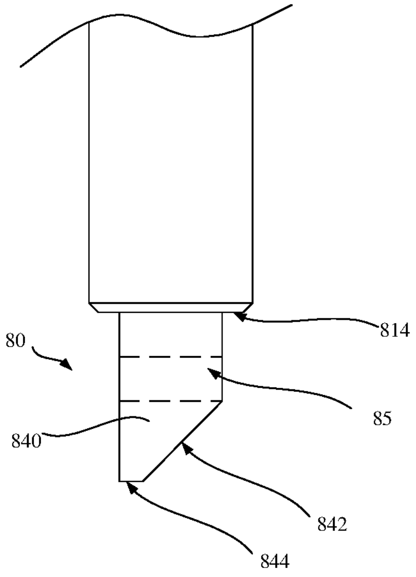
FIG. 24 is a side view of a connector according to some embodiments of the present disclosure.

In some embodiments, as shown in FIG. 24, the recess 85 may also be a through hole, and one opening of the through hole is located on the same side of the mating member 84 as the first inclined face 842.

It should be noted that, the above stated "the directions of the plurality of mating members 84 are the same" may be the opening directions of the recesses 85 of the plurality of mating members 84 are the same.

The electronic apparatus 30 may provide functions such as timing, GPS positioning, motion monitoring, and health monitoring or the like. Motion monitoring functions include, for example, height measurement, movement step measurement, movement speed measurement, and movement acceleration measurement. Health monitoring functions include, for example, heart rate monitoring, blood oxygen content monitoring, and electromyography monitoring or the like.

In some embodiments, the electronic apparatus 30 may include a housing assembly 20 and electronic components disposed within the housing assembly 20. Wherein, the electronic components are used to provide the various above-mentioned functions. The housing assembly 20 may include a housing 22 and an engaging member 24 disposed on the housing 22.

Figure 25:
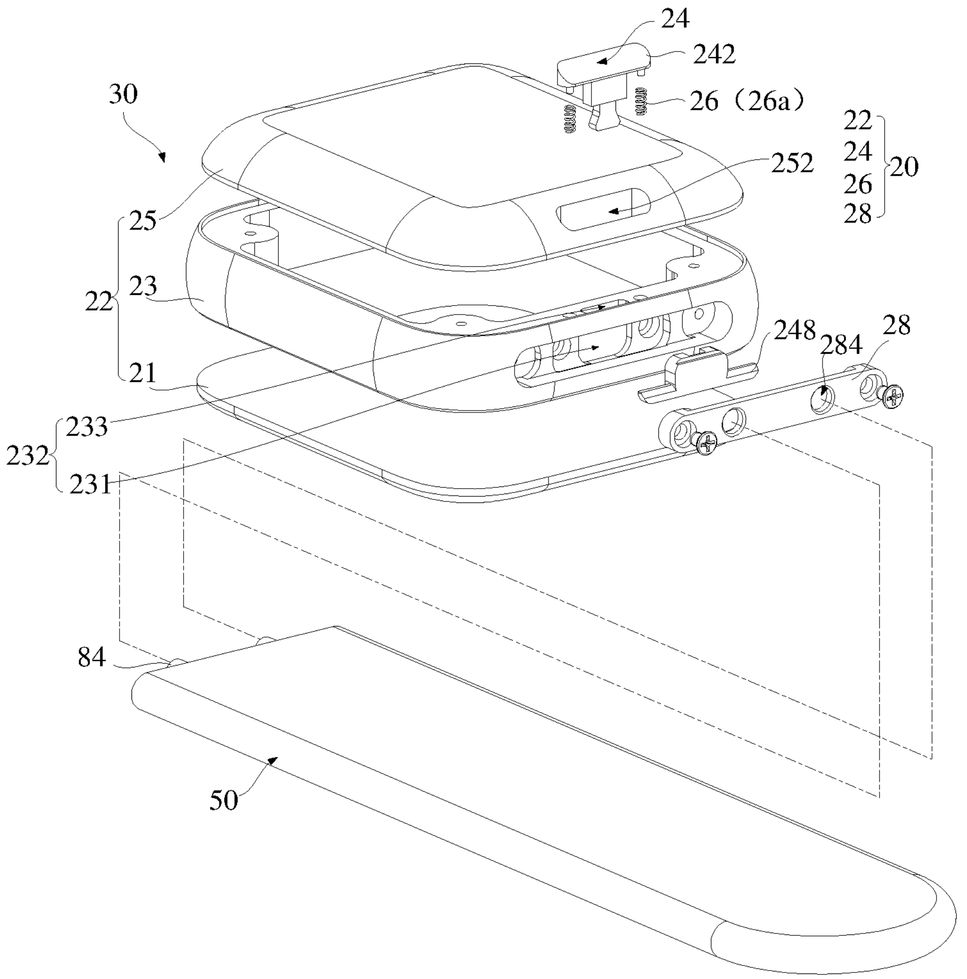
FIG. 25 is an exploded view of the wearable apparatus in FIG. 1.

One embodiment of the housing assembly 20 of the present disclosure is described below. As shown in FIG. 25, the housing assembly 20 includes the housing 22, the engaging member 24, a restoration member 26, and a baffle 28. The engaging member 24, the restoration member 26, and the baffle 28 are all disposed on the housing 22.

Specifically, the housing 22 may be presented in the form of substantially cylindrical, rectangular, elliptic, rectangular shape with fillets or other shapes. The housing 22 defines a mounting groove 232 for mounting the above-mentioned connector 80, wherein, the mounting groove 232 is the mating site described above.

Referring to FIGS. 25 and 1-3, the housing 22 may include a bottom lid 25, a middle frame 23 and a top lid 21. The bottom lid 25 and the top lid 21 are respectively connected to opposite sides of the middle frame 23. The top lid 21 is generally used as a display screen of the wearable apparatus 10. The top lid 21 may be made of, for example, sapphire, glass, or transparent plastic. The bottom lid 25 may be a separate part with respect to the middle frame 23, or may be integrally formed with the middle frame 23. The bottom lid 25 defines a channel 252 penetrating through the bottom lid 25. The middle frame 23 may be made of non-metal materials such as plastic, resin, Perspex, rubber, silicone, wood, ceramic, ceramic alloy or glass or the like, the middle frame 23 may also be made of metal materials such as stainless steel, aluminum alloy, titanium alloy or magnesium alloy or the like. The material of the bottom lid 25 may be the same as or different from that of the middle frame 23.

Figure 26:
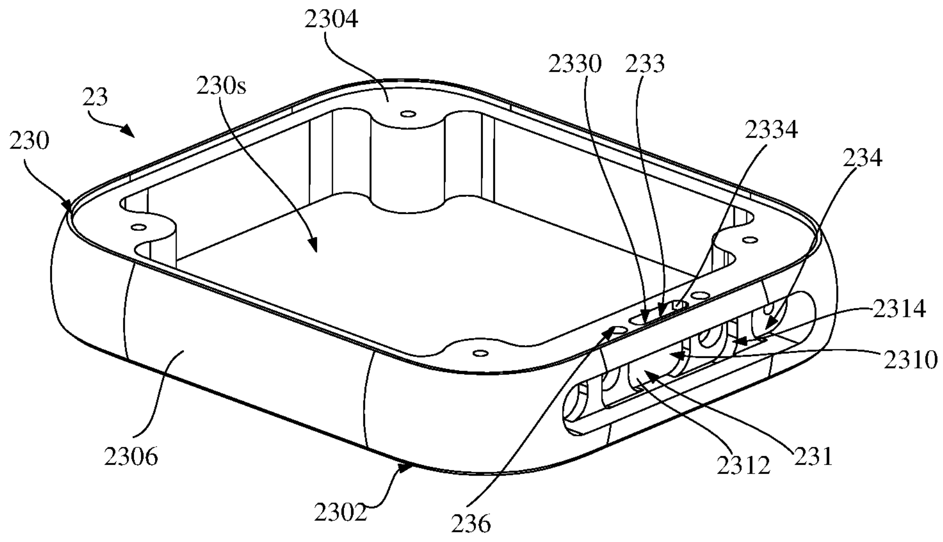
FIG. 26 is a schematic view of the middle frame of the wearable apparatus shown in FIG. 25.

As shown in FIG. 26, the middle frame 23 has side walls 230, the side walls 230 enclose a mounting space **230*s*, the mounting space 230*s*** is configured to accommodate the electronic component.

The side walls 230 enclose a substantially rectangular frame, the frame includes a number of interconnected side faces. For example, the side walls 230 include a top side face 2302, a bottom side face 2304, and four peripheral side faces 2306 connected end-to-end. The top lid 21 is connected to the top side face 2302, and the bottom lid 25 is connected to the bottom side face 2304. The corners formed at the joints of the four peripheral side faces 2306 of the middle frame 23 are filleted, so that the four peripheral side faces 2306 of the middle frame 23 transit smoothly. The joints between the four peripheral side faces 2306 of the middle frame 23 and the outer face of the top lid 21 and the joints between the four peripheral side faces 2306 and the outer face of the bottom lid 25 transit smoothly. In this way, stress concentration could be reduced, and the durability of the structure could be enhanced.

Figure 27:
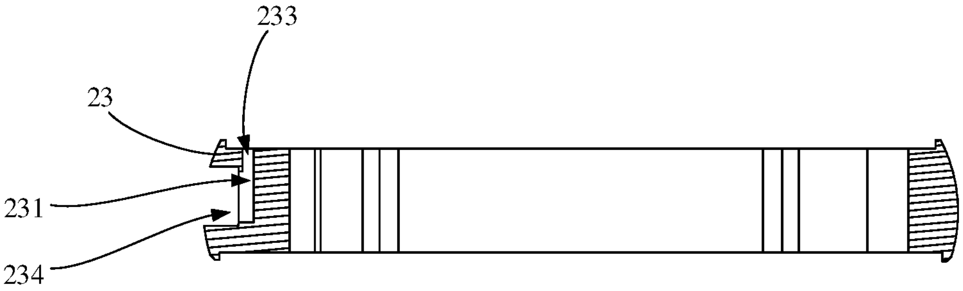
FIG. 27 is a cross-sectional view at a location of the mounting groove of the middle frame in FIG. 26.
Figure 28:
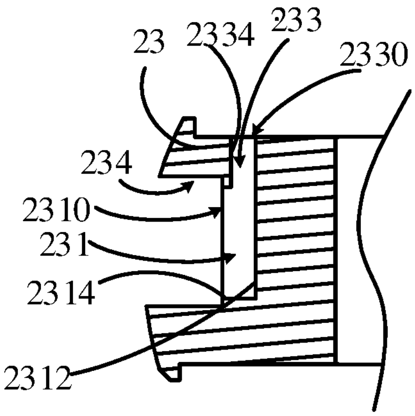
FIG. 28 is a partial enlarged view of the mounting groove shown in FIG. 27.

Further referring to FIGS. 26-28, according to some embodiments of the present application, the mounting groove 232 is defined on the middle frame 23. In some embodiments, the mounting groove 232 may include a first mounting groove 231 and a second mounting groove 233 that connect with each other. In some embodiments, the extending direction of the first mounting groove 231 and the extending direction of the second mounting groove 233 are perpendicular to each other.

The first mounting groove 231 has a first opening 2310, a bottom wall 2312 opposite to the first opening 2310, and a groove wall (also referred to as a first groove wall 2314) extending in a direction from the first opening 2310 to the bottom wall 2312.

The second mounting groove 233 has a second opening 2330 and a groove wall (also referred to as a second groove wall 2334) extending in a direction from the second opening 2330 to the first mounting groove 231. The extending direction of the second mounting groove 233 is the same as the extending direction of the channel 252 of the bottom lid 25, the channel 252 of the bottom lid 25 and the second mounting groove 233 connect at the second opening 2330.

The first opening 2310 and the second opening 2330 are respectively defined on two adjacent side faces of the middle frame 23. The first opening 2310 is defined on the peripheral side face 2306, the second opening 2330 is defined on the bottom side face 2304. Optionally, the second opening 2330 may also be defined on the top side face 2302 of the middle frame 23.

With the arrangement manner of the first mounting groove 231 and the second mounting groove 233, the first opening 2310 and the second opening 2330 are respectively defined on two adjacent side faces without extending to other side faces, so that the damage to the integrity of the housing faces could be reduced. With the above arrangement manner, when the connector 80 is connected to the housing assembly 20, the mating member 84 of the connector 80 is inserted into the first mounting groove 231 from the first opening 2310 towards the bottom wall 2312 in an extending direction of the first side wall 2314. In other words, the mating member 84 is inserted into the first mounting groove 231 in the depth direction of the first mounting groove 231.

A sink 234 may also be defined on a side wall 230 of the middle frame 23.

Specifically, an opening of the sink 234 is on the peripheral side face 2306, the first opening 2310 of the first mounting groove 231 is on a groove bottom of the sink 234, and a cross-sectional profile of the sink 234 is larger than that of the first opening 2310. The sink 234 shown in FIG. 26 is generally racetrack shaped. In other embodiments, the sink 234 may also be in a shape of circular, oval, square, or the like.

Figure 31:
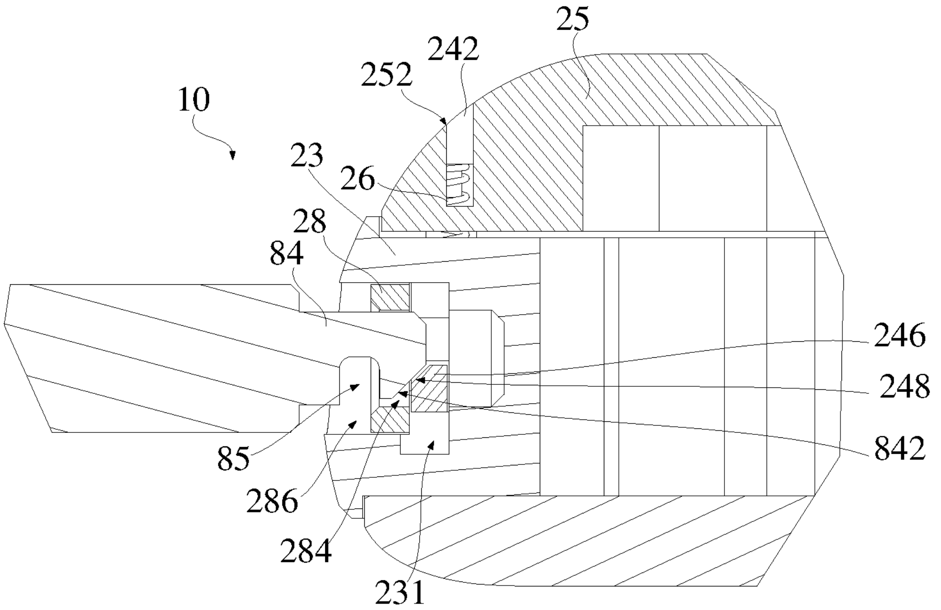
FIG. 31 is a partial enlarged view of a cross-section at a location of a mounting groove according to some embodiments of the present disclosure, wherein a mating member is in a first position.
Figure 32:
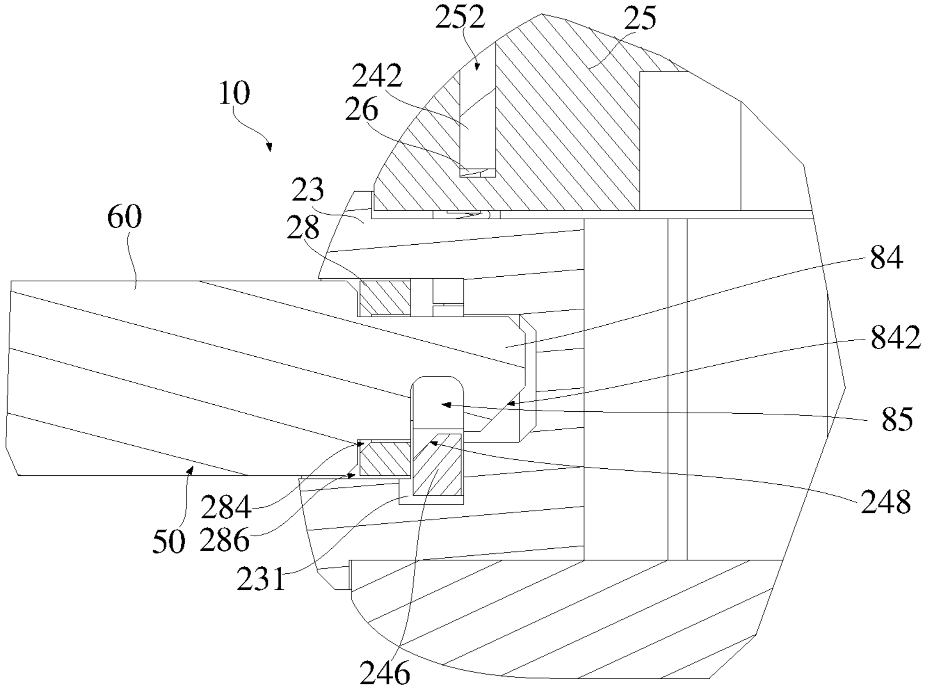
FIG. 32 is a partial enlarged view of a cross section at the location of a mounting groove according to some embodiments of the present disclosure, wherein the mating member is in a second position and the engaging member is not restored.
Figure 33:
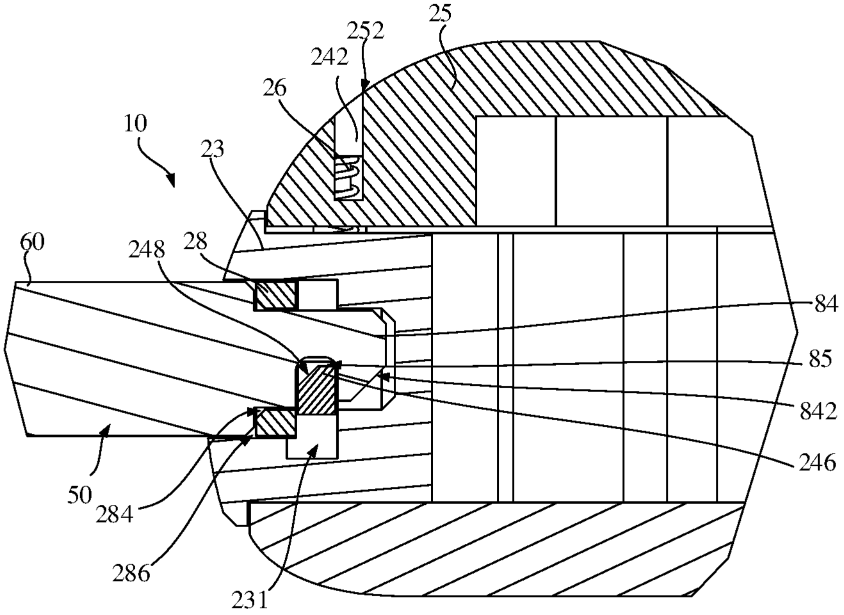
FIG. 33 is a partial enlarged view of a cross-section at the location of the mounting groove according to some embodiments of the present disclosure, wherein the mating member is in the second position and the engaging member is restored.

The engaging member 24 is arranged in the mounting groove 232 and capable of moving relative to the housing 22. When the mating member 84 of the connector 80 is inserted into the mounting groove 232, the first inclined face 842 of the mating member 84 abuts against the engaging member 24, as shown in FIG. 31. When the mating member 84 of the connector 80 is further inserted into the mounting groove 232, the first inclined face 842 of the mating member 84 pushes the engaging member 24 to move on the first inclined face 842, so that the engaging member 24 is displaced. The engaging member 24 moves to provide an avoidance space, the avoidance space facilitates the mating member 84 to be inserted into the mounting groove 232, as shown in FIG. 32. When the connector 80 is inserted into the mounting groove 232 to a predetermined position, the engaging member 24 is restored and is accommodated in the recess 85 of the mating member 84, so that the connector 80 and the housing assembly 20 are connected by snap-fit, as shown in FIG. 33. A position where the mating member 84 is inserted into the mounting groove 232 and begins to abut against the engaging member 24 is defined as the first position, a position where the engaging member 24 is restored and is accommodated in the recess 85 is defined as a second position. During the movement of the mating member 84 from the first position in the mounting groove 232 to the second position in the mounting groove 232, the engaging member 24 moves within a limited position and is restored to engage with the connector 80, to connect the housing 22 and the connector 80.

After the mating member 84 of the connector 80 is inserted into the second position of the mounting groove 232 in a first direction, a part of the engaging member 24 is accommodated in the recess 85 of the mating member 84, so that the inner wall of the recess 85 abuts against the engaging member 24 when the mating member 84 moves in the first direction, thus the movement of the mating member 84 is blocked by the engaging member 24, the movement of the mating member 84 is thereby restricted by the engaging member 24. Conversely, if the engaging member 24 could move in the first direction, the engaging member 24 would abut against an inner wall of the mating member 84, so the movement of the engaging member 24 is also blocked by the mating member 84, the movement of the engaging member 24 is thereby also restricted by the mating member 84. Accordingly, when the engaging member 24 is accommodated in the recess 85 of the mating member 84, the mating member 84 and the engaging member 24 restrict each other's movement in the first direction, so that the mating member 84 and the engaging member 24 are maintained in a connecting state, thereby achieving the engagement between them. Due to the engagement between the engaging member 24 and the mating member 84, the mating member 84 of the connector 80 is locked in the mounting groove 232 of the housing assembly 20 by the engaging member 24, and without changing the engagement state between the engaging member 24 and the engaging member 84, the connector 80 cannot be removed from the mounting groove 232, that is, the connector 80 remains connected to the housing assembly 20, thereby achieving a snap-fit between the connector 80 and the housing assembly 20.

When the mating member 84 of the connector 80 exits from the mounting groove 232, the engaging member 24 moves to be detached from the recess 85 of the mating member 84, thereby providing an avoidance space for the mating member 84 to exit the mounting groove 232, at this point, the engaging member 24 is in a state shown in FIG. 32.

The present disclosure provides an engaging member 24 in the mounting groove 232 of the housing assembly 20, and the engaging member 24 moves to offer an avoidance space when the connector 80 is inserted into or removed from the mounting groove 232, and at the time the connector 80 arrives at the predefined location, that is, the second position, the engaging member 24 is restored to engage with the connector 80, thereby locks the connector 80 in the mounting groove 232, so as to achieve the connection of the housing assembly 20 and the connector 80. Therefore, the structure of the wearable apparatus 30 could be simple, and the connection between the connector 80 and the electronic apparatus 30 could be more reliable. In this way, when assembling the connector 80 and the electronic apparatus 30, the user is just required to insert the connector 80 into the electronic apparatus 30. Accordingly, the process of assembly and disassembly could be simple, labor-saving, and quick, which improves the user experience.

The engaging member 24 could be restored by driving it with the restoration member 26 or by pressing or pulling it manually. It should be noted that, the restoration of the engaging member 24 may refer to that the engaging member 24 is restored to the original position, and of course, it may also refer to that the engaging member 24 is not completely restored to the original position, but is restored to an intermediate position.

It will be noted that, the driving force causes the engaging member 24 to move may also be a force that the user directly or indirectly applies on the engaging member 24. In some embodiments, when the connector 80 is inserted into the mounting groove 232, the engaging member 24 is moved by the force generated by the first inclined face 842 of the connector 80. It will be noted that, the engaging member 24 may be provided with an inclined face (also referred to as a second inclined face 248) that matches the first inclined face 842. Of course, in other embodiments, the engaging member 24 may not be provided with an inclined face.

The movement of the engaging member 24 may be a linear movement. The moving direction of the engaging member 24 is defined as a second direction, and the second direction is different from the direction in which the connector 80 is inserted into or removed from the mounting groove 232. In some embodiments, the second direction is perpendicular to the direction in which the connector 80 is inserted into or removed from the mounting groove 232.

The engaging member 24 may be made of metal materials such as stainless steel, aluminum alloy, titanium alloy, or magnesium alloy or the like. The engaging member 24 may also be made of non-metal materials such as plastic, ceramic alloy or the like.

Figure 34:
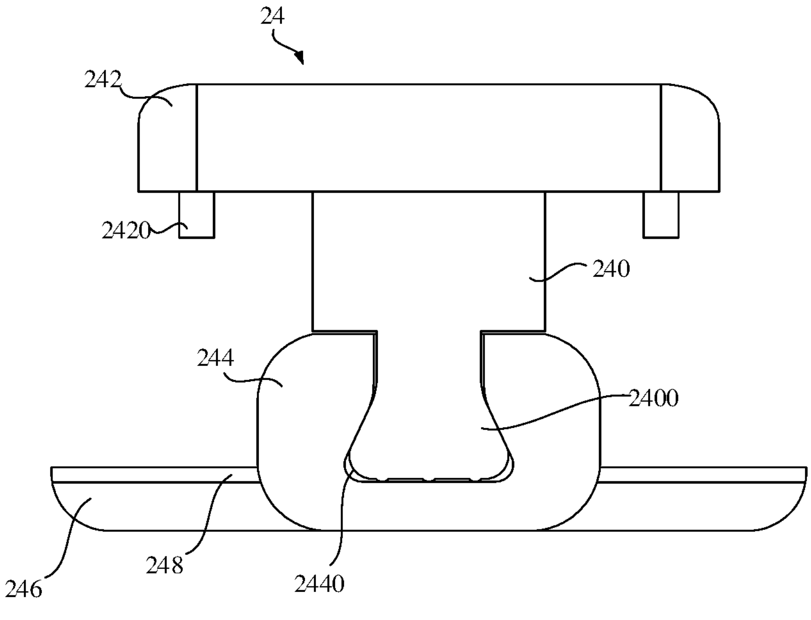
FIG. 34 is a rear view of the engaging member of the embodiment in FIG. 30.
Figure 35:
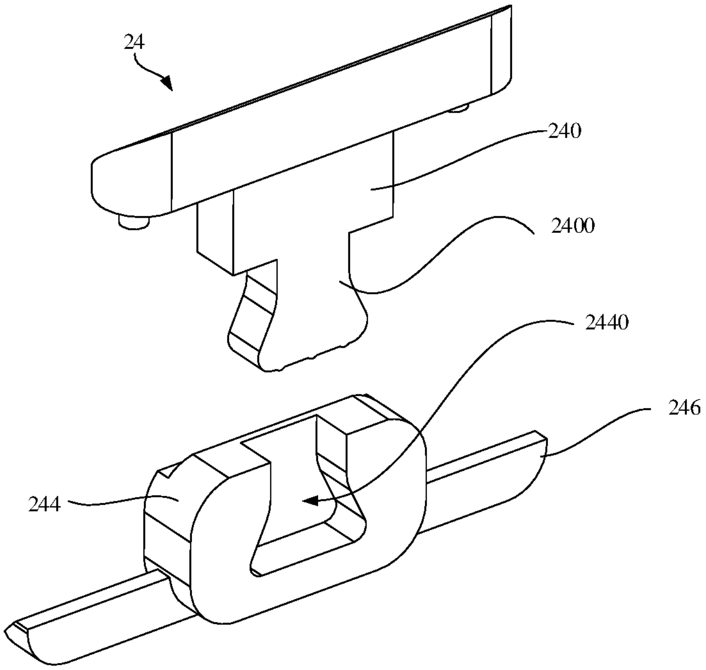
FIG. 35 is an exploded view of the engaging member of the embodiment in FIG. 30 from a perspective.
Figure 36:
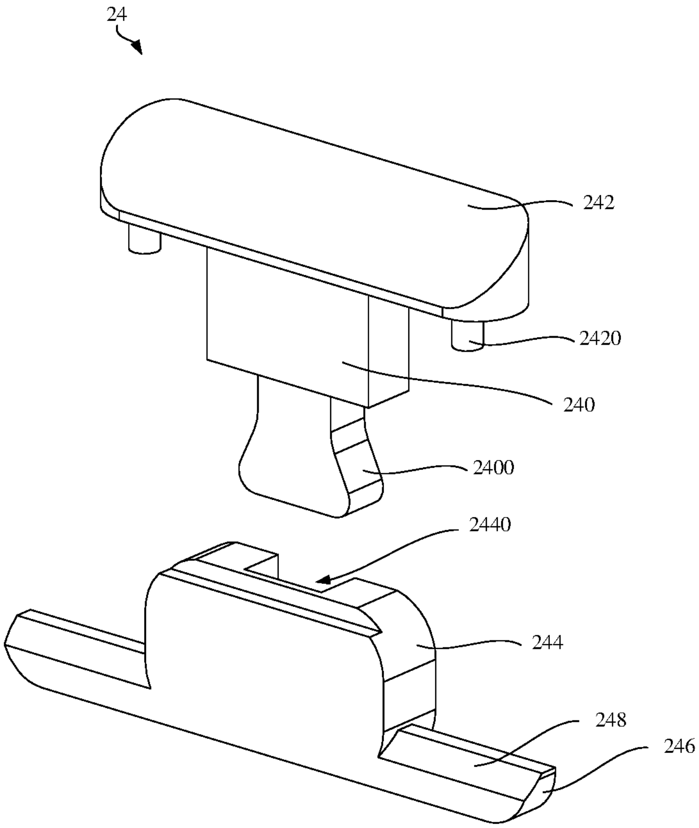
FIG. 36 is an exploded view of the engaging member of the embodiment in FIG. 30 from another perspective.

In some embodiments, as shown in FIGS. 34-36, the engaging member 24 includes a pressing portion 240, a first engaging portion 244, and a second engaging portion 246 connected successively.

Figure 30:
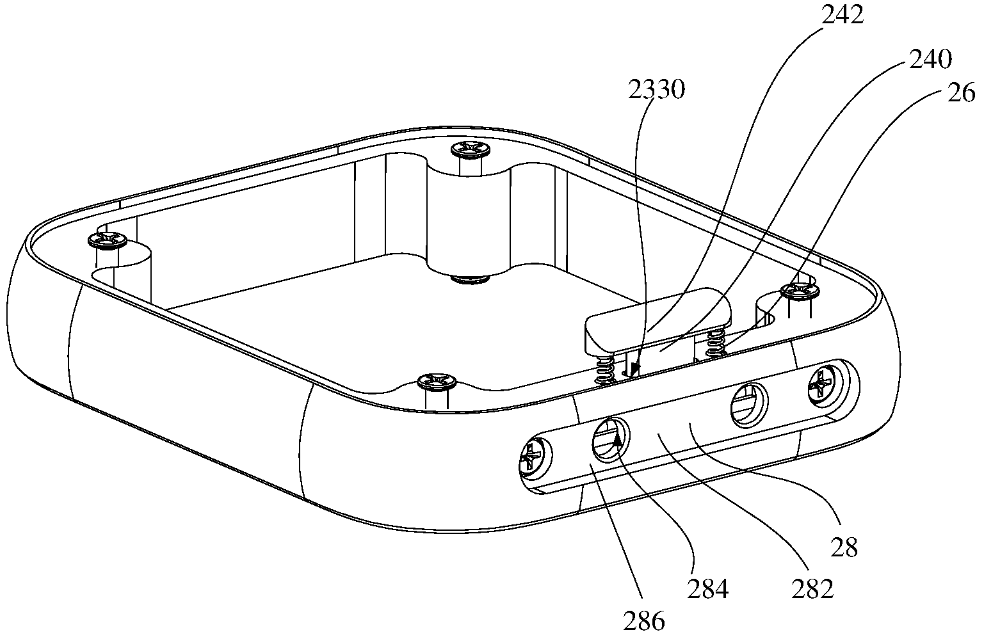
FIG. 30 is an assembly diagram of a middle frame, an engaging member, a restoration member, and a baffle according to some embodiments of the present disclosure.

Referring to FIG. 30, at least a part of the pressing portion 240 is disposed in the second mounting groove 233 and is exposed to the second opening 2330. Therefore, the user could press or pull the pressing portion 240 through the second opening 2330. A dovetail joint 2400 is provided at one end of the pressing portion 240.

In some embodiments, a pressing cap 242 is disposed at an end of the pressing portion 240 away from the first engaging portion 244. The pressing cap 242 is arranged in the channel 252 of the bottom lid 25 and capable of moving relative to the bottom lid 25. The width of the pressing cap 242 is larger than the width of the pressing portion 240. Specifically, the width of the pressing cap 242 is larger than the width of the second mounting groove 233, so that when the pressing cap 242 moves toward the second mounting groove 233, the pressing cap 242 is prevented from entering the second mounting groove 233. The two sides of the pressing cap 242 are provided with pillars 2420 extending towards the first engaging portion 244. The number of the pillars 2420 shown in FIG. 34 is two. In other embodiments, the number of the pillars 2420 may be one or more than two, which is not limited in the present disclosure.

The first engaging portion 244 is disposed in the first mounting groove 231 and is configured to confine the first engaging portion 244 and the second engaging portion 246 in the first mounting groove 231. Specifically, in an extending direction perpendicular to the second mounting groove 233, the width of the first engaging portion 244 is larger than the width of the second mounting groove 233. When the first engaging portion 244 moves to joint section of the second mounting groove 233 and the first mounting groove 231, the first engaging portion 244 abuts against the groove wall 2314 of the first mounting groove 231 on the periphery of the second mounting groove 233, thereby preventing the first engaging portion 244 from entering into the second mounting groove 233, thus the first engaging portion 244 is confined in the first mounting groove 231.

The first engaging portion 244 has a shape of square. One end of the first engaging portion 244 is provided with a dovetail slot 2440, the dovetail slot 2440 cooperates with the dovetail joint 2400 on the pressing portion 240. With the cooperation of the dovetail joint 2400 and the dovetail slot 2440, the snap-fit between the pressing portion 240 and the first engaging portion 244 is achieved. Wherein, the fit between the dovetail joint 2400 and the first engaging portion 244 which defines the dovetail slot 2440 may be interference fit.

Referring to FIGS. 31-33 and 34-36, the second engaging portion 246 is configured to engage with the mating member 84. The second engaging portion 246 is disposed in the first mounting groove 231 and is connected to an end of the first engaging portion 244 away from the pressing portion 240. Since the first engaging portion 244 is prevented from entering into the second mounting groove 233, the second engaging portion 246 is therefore also confined in the first mounting groove 231 by the first engaging portion 244. In some embodiments, the end of the second engaging portion 246 away from the first engaging portion 244 may extend from a face away from the first opening to form a protrusion. The protrusion and the second engaging portion 246 may define an accommodation space to accommodate a part of the mating member 84.

Specifically, the second engaging portion 246 may be a bar. The width of the bar is larger than that of the first engaging portion 244, the bar is configured to engage with the connector 80. The second inclined face 248 may be provided on the bar and provided on a side of the bar facing the first opening 2310. The bar extends in a third direction perpendicular to the first direction and the second direction. The groove of the mating member 84 penetrates through the side face 840 of the mating member 84 in the third direction. Two ends of the bar may extend beyond the first engaging portion 244. In the example that the number of the mating member 84 is two, each of the two mating members 84 may match with a corresponding end of the bar. The other side of the bar, which is away from the first opening, may have a flat face substantially parallel to second direction. For example, the angle between face of the bar away from the first opening and the second direction is 0° to 5°, so that the bar and the mating member 84 can limit position together in better manner after the bar is received in the recess 85. Thus, the connector 80 could be prevented from detaching from the housing assembly 20.

When the mating member 84 is inserted into the first mounting groove 231 in the first direction, that is, in the extending direction of the first groove wall 2314, the first inclined face 842 abuts against the second inclined face 248 at the first position, as shown in FIG. 31. When the mating member 84 continues to be inserted into the first mounting groove 231 in the first direction, the first inclined face 842 acts on the second inclined face 248, such that the engaging member 24 as a whole moves in the second direction, that is, in the extending direction of the second groove wall 2334, so as to offer an avoidance space for the mating member 84, as shown in FIG. 32. When the mating member 84 reaches the second position, the engaging member 24 is restored and the bar falls into the recess 85 of the mating member 84. Therefore, the bar prevents the mating member 84 from exiting the first mounting groove 231, as shown in FIG. 33.

When mounting the engaging member 24, the pressing portion 240 could be inserted into the second mounting groove 233 through the second opening 2330, and the dovetail joint 2400 of the pressing portion 240 could be inserted into the first mounting groove 231, the pressing cap 242 is left outside of the second opening 2330. The second engaging portion 246 and the first engaging portion 244 are mounted into the first mounting groove 231 from the first opening 2310, and the dovetail slot 2440 on the first engaging portion 244 matches with the dovetail joint 2400, so that the first engaging portion 244 is connected to the pressing portion 240. The bottom lid 25 is then mounted to the middle frame 23, and the pressing cap 242 is placed in the channel 252 of the bottom lid 25. In the natural state, the outer face of the pressing cap 242 and the outer face of the bottom lid 25 are flush with each other and cooperate to form a smooth face.

The first engaging portion 244 and the second engaging portion 246 may be an integrated structure, or the first engaging portion 244 and the second engaging portion 246 may be connected by tenoning, bonding, welding, screwing, or the like.

The restoration member 26 is disposed between the engaging member 24 and the housing 22 and is configured to drive the engaging member 24 to restore after the engaging member 24 moves. For example, as shown in FIGS. 30-31, the restoration member 26 may be an elastic member 26*a*, such as a spring, rubber, or the like. One end of the elastic member 26*a* is sleeved on the pillar 2420 of the pressing cap 242 so as to be connected to the engaging member 24, and the other end of the pressing cap 242 is connected to the housing 22.

Figure 29:
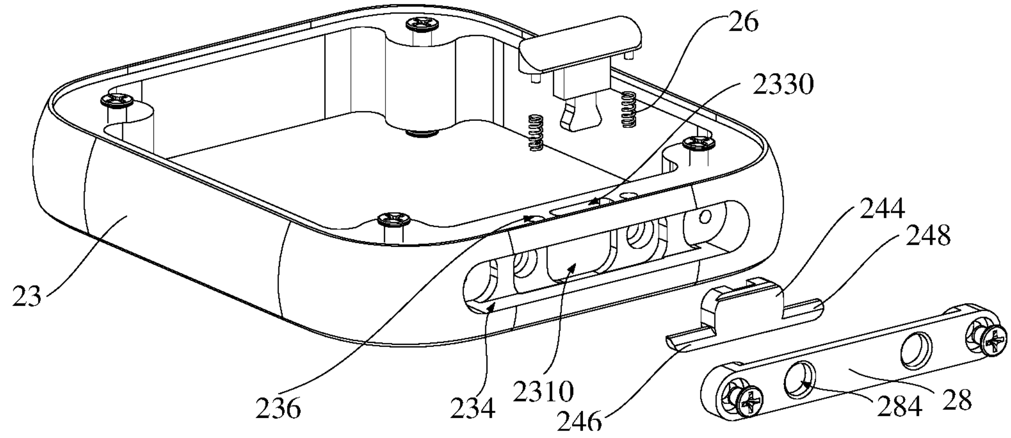
FIG. 29 is an exploded view of the middle frame, the engaging member, the restoration member and the baffle in FIG. 25.

Specifically, referring to FIGS. 29-30, the bottom side face 2304 of the middle frame 23 defines a receiving hole 236 at a position corresponding to the pillar 2420, the receiving hole 236 is a blind hole and has a bottom wall. The pillar 2420 is accommodated in the receiving hole 236 together with the elastic member 26*a* sleeved on the pillar 2420, so that one end of the elastic member 26*a* abuts against the bottom wall of the receiving hole 236.

When the mating member 84 continues to be inserted into the first mounting groove 231 from the first position, the first inclined face 842 drives the engaging member 24 to move away from the second mounting groove 233, and the pressing cap 242 accordingly moves towards the second mounting groove 233, thereby squeezing the elastic member 26*a*. Before the mating member 84 reaches the second position, since the bar and the mating member 84 remain in abutting state, the deformed elastic member 26*a* couldn't be restored to its original shape, and thus remains in compressed state. When the mating member 84 reaches the second position, the bar is aligned with the recess 85 of the mating member 84, and the bar and the mating member 84 no longer abut against each other, at this point, the elastic member 26*a* is restored to its original shape, thereby driving the pressing cap 242 to restore in a direction away from the second mounting groove 233, so that the bar moves towards the second mounting groove 233, that is, the bar is driven to restore, so that the bar falls into the recess 85.

When removing the connector 80 from the electronic apparatus 30, one could first depress the pressing cap 242, such that the bar moves away from the second mounting groove 233 to exit from the recess 85, thereby providing an avoidance space for the mating member 84. Since the pressing cap 242 has a large enough touching area, so that it is convenient for the user to depress the pressing cap 242 by fingers. Next, the mating member 84 is pulled out of the first mounting groove 231 in the first direction. After the pressing cap 242 is released, the elastic member 26*a* restores to its original shape, and the engaging member 24 is restored.

Figure 37:
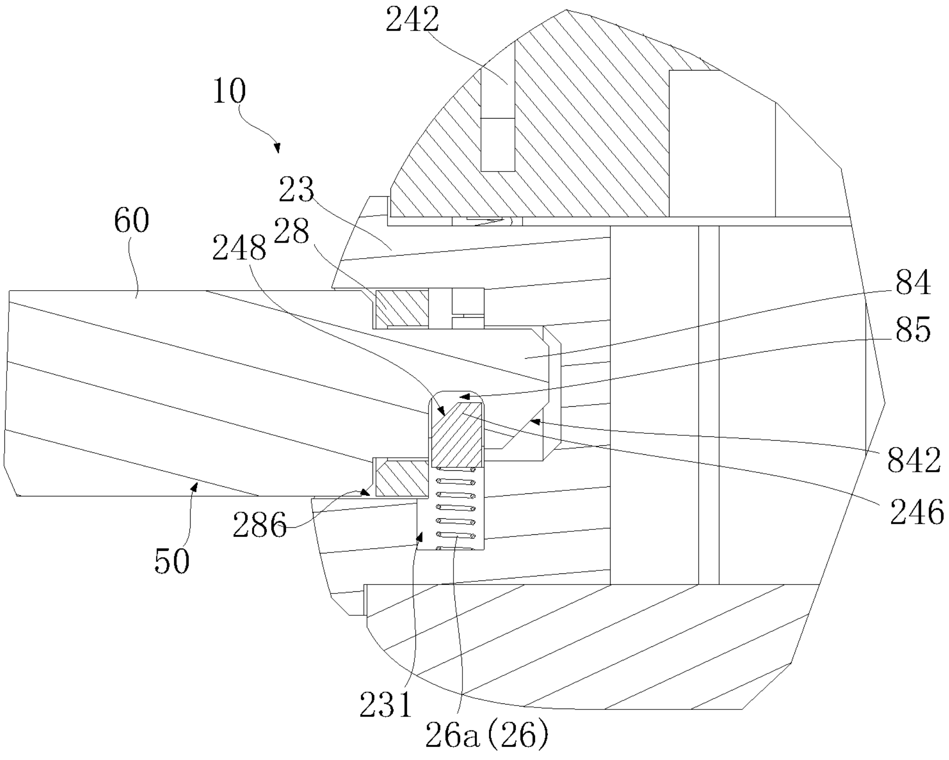
FIG. 37 is a partial enlarged view at a location of a mounting groove according to some embodiments of the present disclosure after the wearable apparatus is assembled.

In some embodiments, as shown in FIG. 37, the bottom side face 2304 of the middle frame 23 may not need to define a receiving hole 236, and the elastic member 26*a* may be disposed in the first mounting groove 231. One end of the elastic member 26*a* may be connected to a side of the second engaging portion 246 away from the first engaging portion 244, and the other end of the elastic member 26*a* may be connected to the first groove wall 2314 of the first mounting groove 231.

Figure 38:
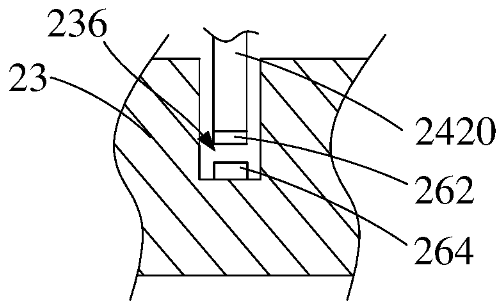
FIG. 38 is a schematic partial cross-sectional view at a location of a receiving hole of a wearable apparatus according to some embodiments of the present disclosure.

In some embodiments, as shown in FIG. 38, the restoration member 26 may also be a magnet set 26*b*. Specifically, the magnet set 26*b* includes a first magnet 262 and a second magnet 264. The first magnet 262 is connected to the engaging member 24, and the second magnet 264 is connected to the housing 22. Faces of the first magnet 262 and the second magnet 264 facing each other may have a same magnetism and repel each other. In some embodiments, the first magnet 262 may be disposed on the pillar 2420, and the second magnet 264 may be disposed on the bottom wall of the receiving hole 236. Since the faces of the first magnet 262 and the second magnet 264 facing each other have the same magnetism and repel each other, the second magnet 264 drives the first magnet 262 to move away from the second magnet 264, so that the pressing cap 242 moves in a direction away from the second mounting groove 233, thus the second engaging portion 246 moves in a direction towards the second mounting groove 233, thereby driving the second engaging portion 246 to restore.

It could be understood that, the first magnet 262 and the second magnet 264 may also be mounted at other locations. The similarities and differences between the first magnet 262 and the second magnet 264 depend on the specific mounting positions of the first magnet 262 and the second magnet 264, which is not limited in this disclosure, as long as the engagement member 24 could be restored.

Figure 39:
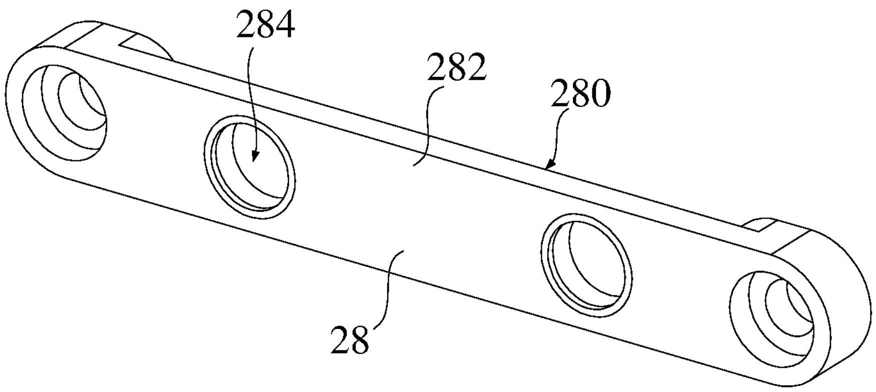
FIG. 39 is a schematic perspective view of a baffle according to the embodiment in FIG. 29.
Figure 40:
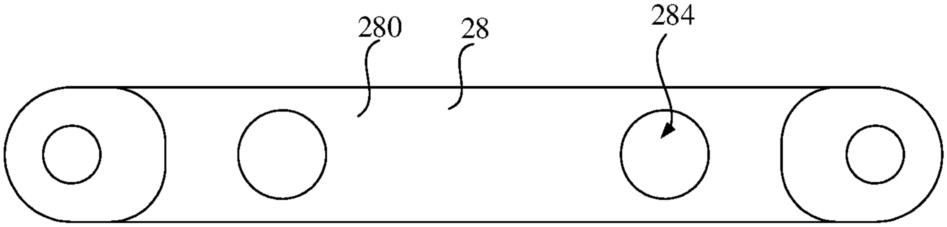
FIG. 40 is a front view of the baffle of the embodiment in FIG. 29.

As shown in FIG. 30, the baffle 28 is mounted in the sink 234 and is connected to the housing 22. The shape of the baffle 28 may match with the shape of the sink 234. As shown in FIGS. 39-40, the baffle 28 includes a first face 280 and a second face 282 disposed opposite to each other, The first face 280 faces the first mounting groove 231. The baffle 28 defines a through hole 284 penetrating through the first face 280 and the second face 282, and the through hole 284 connects with the first opening 2310. The mating member 84 of the connector 80 could pass through the through hole 284 and enter the first mounting groove 231. The two ends of the first face 280 are provided with protrusions respectively, each of the protrusions may define a screw hole, and a bottom wall of the sink 234 defines screw holes corresponding to the screw holes in the protrusions. The baffle 28 is connected to the middle frame 23 through a screw which passes through and is fixed in each screw hole on the protrusions and the screw hole on the side wall 230 of the middle frame 23. The protrusions could improve the strength of the baffle 28, so that the firmness and reliability of the connection between the baffle 28 and the middle frame 23 through threaded fastener can be improved. The protrusions are provided in two ends of the baffle 28, the middle portion of the baffle 28 are relative thin, which could allow that the thickness of the middle portion of the baffle 28 could be reduced, so that the wearable apparatus 10 can be designed to be light and thin, so that the components can be arranged compactly. Furthermore, the width of the recess 85 in the first direction is less than the thickness of the middle portion of the baffle 28. Thus, the recess 85 could be prevented from being stuck on the baffle 28 when the connector 80 moves into the first mounting groove 231 or move out of the first mounting groove 231 along the through hole 284, so that the reliability of the disassembly and assembly of the connector 80 could be improved.

The number and distribution of through holes 284 correspond with the number and distribution of mating members 84 respectively. For example, when the connector 80 includes two mating members 84 spaced apart from each other, the baffle 28 would include two through holes 284 spaced apart from each other.

The shape of the through hole 284 corresponds to the shape of the mating member 84. Specifically, the shape of the through hole 284 matches the cross-sectional shape of the mating member 84. For example, when the cross section of the mating member 84 is racetrack-shaped, the through hole 284 is racetrack-shaped. When the cross section of the mating member 84 is circular, the through hole 284 is circular.

The size of the through hole 284 is approximately equal to the size of the outer contour of the mating member 84. Specifically, the size of the through hole 284 may be slightly larger than that of the outer contour of the mating member 84, so that the mating member 84 could pass through the through hole 284 easily, and the through hole 284 and the mating member 84 could tightly fit together, so as to facilitate the waterproof and dustproof design of the wearable apparatus 10.

Optionally, the thickness of the baffle 28 is less than the depth of the sink 234, walls of the sink 234 and the second face 282 of the baffle 28 define a semi-open accommodating space 286. The accommodating space 286 could be configured to accommodate the main body of the connector 80 after the connector 80 is mounted, and the accommodating space 286 could also be configured to accommodate a part of the strap body 60. In this way, the connector 80 could be concealed, so that the interference on the connector 80 from the surrounding environment could be reduced, and the connection reliability between the housing 22 and the strap body 60 could be improved.

Figure 41:
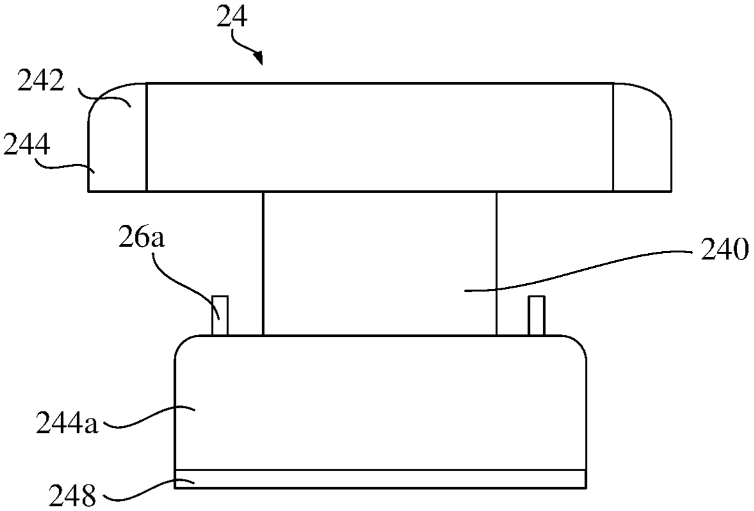
FIG. 41 is a schematic view of an engaging member and a restoration member according to some embodiments of the present disclosure.
Figure 42:
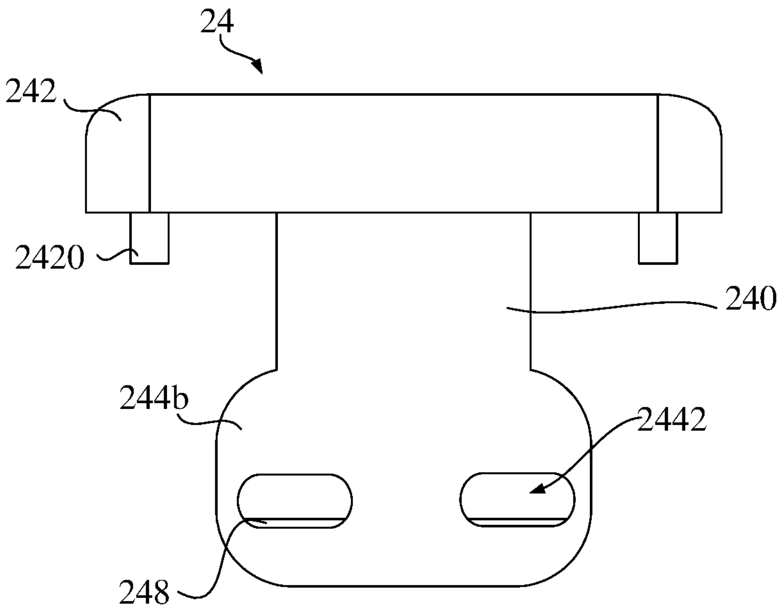
FIG. 42 is a schematic view of an engaging member according to some embodiments of the present disclosure.

In some embodiments, as shown in FIG. 41, the engaging member 24 includes an engaging portion 244*a* and a pressing portion 240 connected to each other. The engaging portion 244*a* and the pressing portion 240 may be an integrated structure or may be separated components connected together by means of tenon, welding, bonding, screwing, or the like. The structure of the engaging member 24 in this embodiment is different from the above-mentioned engaging member 24 at least in that the second engaging portion 246 is not necessary. That is, the engaging portion 244*a* of this embodiment may be the first engaging portion 244 of the above embodiment. Wherein, the second inclined face 248 is disposed at an end of the engaging portion 244*a* away from the pressing portion 240. Alternatively, as shown in FIG. 42, in some embodiments, an end of the engaging portion 244*b* away from the pressing portion 240 defines a fitting hole 2442. In the first direction, the fitting hole 2442 penetrates through the engaging portion 244*b*, and the second inclined face 248 is provided on an inner wall of the fitting hole 2442. The mating member 84 passes through the fitting hole 2442 to engage with the engaging portion 244*b*. Therefore, the engaging portion 244*b* could have the function of the first engaging portion 244 in the above embodiment to confine the engaging portion in the first mounting groove 231, and could also have the function of the second engaging portion in the above embodiment to engage with the mating member 84 of the connector 80, so as to connect the connector 80 with the housing assembly 20.

In the above situation, the restoration member 26 may be provided between the engaging portions 244*a*, 244*b* and the housing 22. For example, when the restoration member 26 is an elastic member 26*a*, one end of the elastic member 26*a* may be connected to an end of the engaging portion 244*a*, 244*b* connected with the pressing portion 240, as shown in FIG. 41; the other end of the elastic member 26*a* is connected to the housing 22, for example, connected to the first groove wall 2314 of the first mounting groove 231 adjacent to the second mounting groove 233. Alternatively, one end of the elastic member 26*a* is connected to an end of the engaging portion 244*a*, 244*b* away from the pressing portion 240, and the other end of the elastic member 26*a* is connected to the housing 22, for example, connected to the first groove wall 2314 of the first mounting groove 231 away from the second mounting groove 233.

Figure 43:
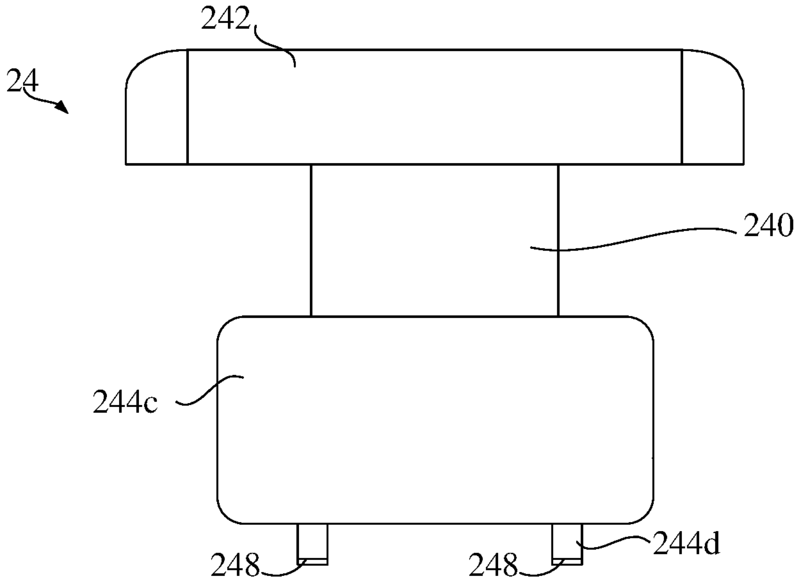
FIG. 43 is a schematic view of an engaging member according to some embodiments of the present disclosure.

In the situation where the recess 85 of the mating member 84 is a through hole, as shown in FIG. 43, the engaging member 24 may include an engaging portion 240 and a pressing portion 244*c* connected to each other. Different from the above embodiment, a column 244*d* is provided at an end of the engaging portion 244*c* away from the pressing portion 240, and the second inclined face 248 is provided at an end of the column 244*d*. When the mating member 24 is inserted into the second position in the first mounting groove 231, the column 244*d* is inserted into the recess 85 (i.e., the through hole) of the mating member 84.

Figure 44:
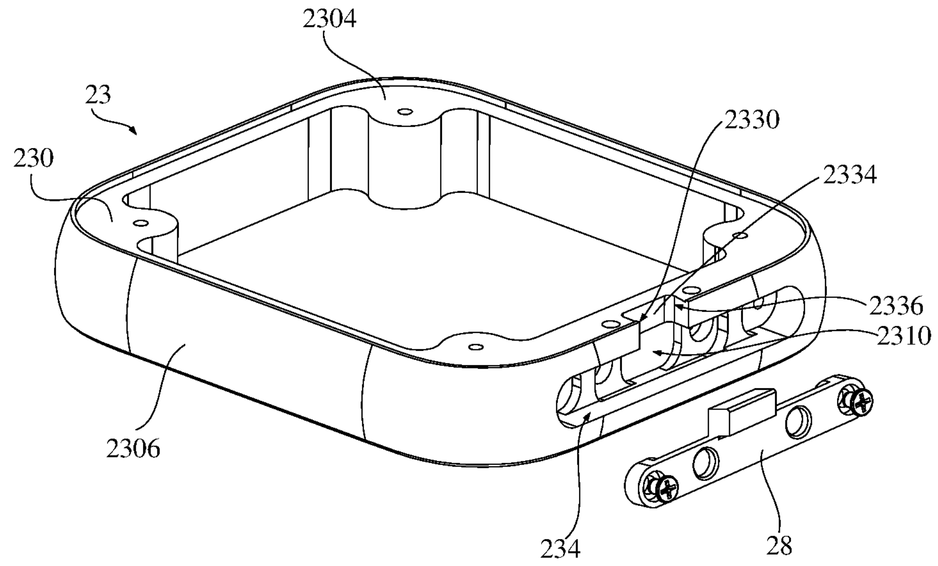
FIG. 44 is an exploded view of a middle frame and a baffle according to some embodiments of the present disclosure.

In some embodiments, as shown in FIG. 44, a third opening 2336 is defined on the second groove wall 2334 of the second mounting groove 233, the third opening 2336 is in connection with the first opening 2310 and the second opening 2330. When the engaging member 24 is mounted, the engaging member 24 could be inserted into the mounting groove 232 through the third opening 2336 and the first opening 2310. Specifically, the first engaging portion 244 and the second engaging portion 246 are mounted to the first mounting groove 231 through the first opening 2310, and the pressing portion 240 is mounted to the second mounting groove 233 through the third opening 2336, the pressing cap 242 is kept outside the second opening 2330, and then the baffle 28 is disposed at the third opening 2336 and the first opening 2310, the baffle 28 covers the third opening 2336, meanwhile the through hole 284 in the baffle 28 is connected with the first opening 2310. In this situation, the engaging members 24 of any of the foregoing embodiments, for example, the engaging members 24 including the pressing portion 240, the pressing cap 242, the first engaging portion 244, the second engaging portion 246 or the like may be an integrated structure.

The present disclosure further provides a connector, a strap, a housing assembly, and an electronic apparatus, which may be the connector 80, the strap 50, the housing assembly 20, and the electronic apparatus 30 of any of the above embodiments respectively.

The present disclosure provides a first inclined face on the mating member of the connector and defines a recess on the mating member of the connector, such that when the mating member is being inserted into the housing assembly, the first inclined face could engage with the housing assembly and push the housing assembly to move to offer an avoidance space, such that the mating member could be inserted to a predefined location in the housing assembly, and locked in the housing assembly by the engaging member which is restored and accommodated in the recess. Therefore, structure of the wearable apparatus could be simple, and the connection between the connector and the electronic apparatus could be more reliable. In this way, the user only needs to insert the connector into the housing assembly when assembling the connector and the housing assembly.

The present disclosure provides an engaging member in the mounting groove of the housing assembly. The engaging member offers an avoidance space by moving when the connector is inserted into or removed from the mounting groove, and at the time the connector arrives at a predefined location, the engaging member restores to engage with the connector, thereby locks the connector in the mounting groove, so as to connect the connector to the housing assembly. Therefore, structure of the wearable apparatus could be simple, and the connection between the connector and the electronic apparatus could be more reliable. In this way, the user only needs to insert the connector into the electronic apparatus when assembling the connector and the electronic apparatus. The process of assembly and disassembly is simple, labor-saving and quick, which could improve the user's experience. Furthermore, there is no need to form the larger grooves or holes on the housing, so that the components can be arranged compactly.

The present disclosure further provides a method for assembling a housing assembly and a connector, wherein the housing assembly and the connector are applied to the above-mentioned wearable apparatus, and the housing assembly may be the housing assembly 20 of any of the foregoing embodiments, the connector may be the connector 80 of any of the foregoing embodiments.

Figure 45:
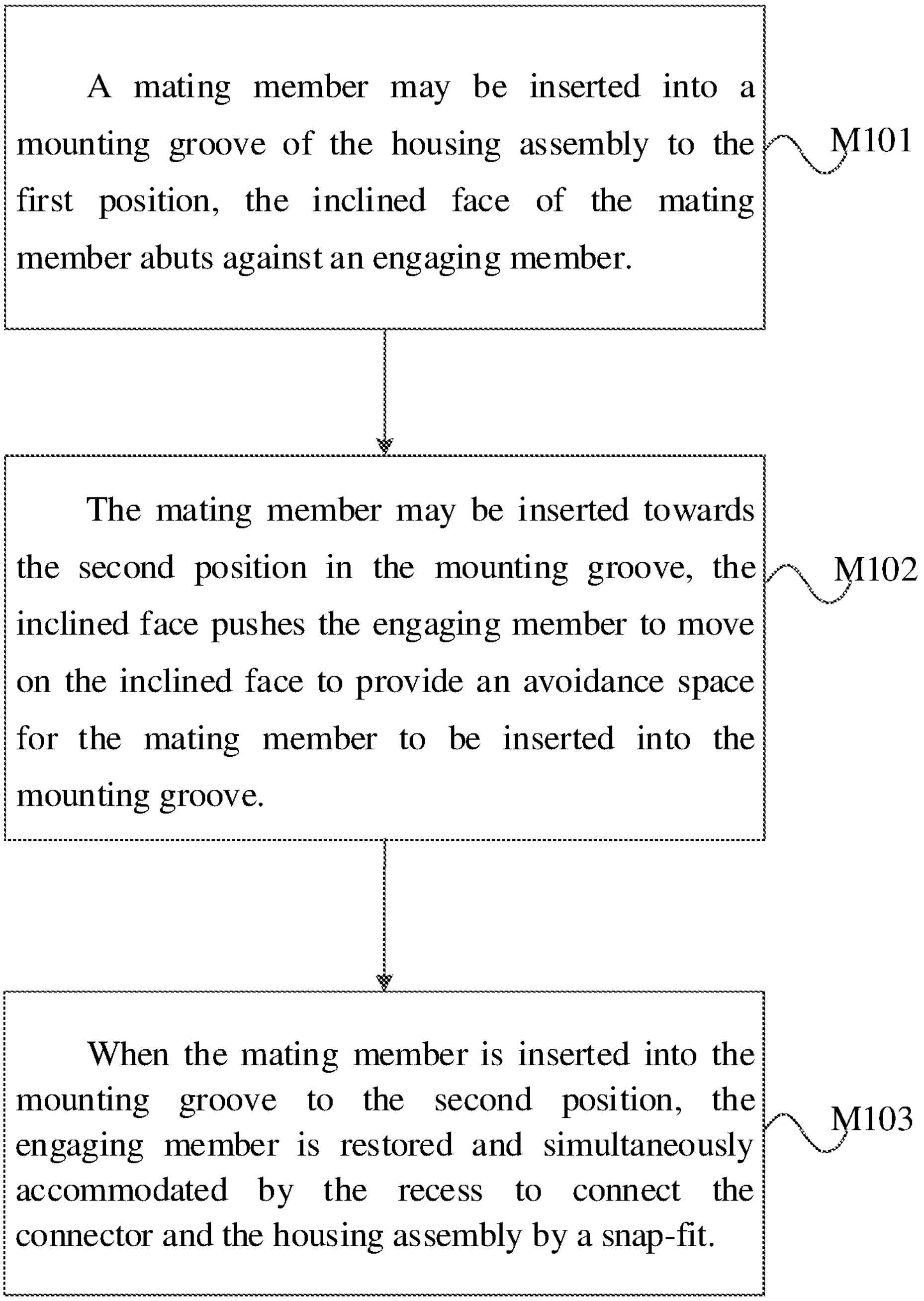
FIG. 45 is a schematic flowchart of an assembly method of a housing assembly and a connector of the present disclosure.

In some embodiments, please refer to FIG. 45. Operations of the assembly method may include the following blocks.

In block M101: A mating member may be inserted into a mounting groove of the housing assembly to the first position, the inclined face of the mating member abuts against an engaging member.

In block M102: The mating member may be inserted towards the second position in the mounting groove, the inclined face pushes the engaging member to move on the inclined face to provide an avoidance space for the mating member to be inserted into the mounting groove.

In block M103: When the mating member is inserted into the mounting groove to the second position, the engaging member is restored and simultaneously accommodated in the recess to connect the connector and the housing assembly by snap-fit.

In some embodiments, the engaging member 24 may be provided with a second inclined face 248. In the block M101, the first inclined face 842 of the connector 84 abuts against the second inclined face 248 of the engaging member 24. In the block M102, the second inclined face 248 moves on the first inclined face 842.

In some embodiments, the engaging member 24 moves linearly, and the moving direction of the engaging member 24 is different from a direction in which the connector 80 is inserted into the mounting groove 232. Specifically, the moving direction of the engaging member 24 may be perpendicular to the direction in which the connector 80 is inserted into the mounting groove 232.

In some embodiments, the mounting groove 232 includes a first mounting groove 231 and a second mounting groove 233 connecting with each other, in the blocks M101 and M102, the mating member 24 is inserted to the first position and the second positions along the extending direction of the first groove wall 2314, the engaging member 24 moves along the extending direction of the second groove wall 2334.

In some embodiments, the housing assembly 22 includes a restoration member 26, for example, an elastic member 26*a*, and the engaging member 24 is driven to restore by the elastic member 26*a*.

In some embodiments, the engaging member 24 includes a pressing portion 240, a first engaging portion 244 and a second engaging portion 246 connected successively. The elastic member 26*a* is connected between the pressing portion 244 and the housing 22. Prior to the block M101, the first engaging portion 244 abuts against the housing 22 to confine the first engaging portion 244 and the second engaging portion 246 in the first mounting groove 231. In the block M102, the second engaging portion 246 moves on the first inclined face 842 of the mating member 84; the pressing portion 240 squeezes the elastic member 26*a* towards the housing 22, so that the elastic member 26*a* is compressed. In the block M103, the elastically deformed elastic member 26*a* is restored to its original shape and during this process, drives the engaging member 24 to restore, so that the second engaging portion 246 enters the recess 8.

In some embodiments, the engaging member 24 includes a pressing portion 240 and an engaging portion 244*a* connected successively. Prior to the block M101, the engaging portion 244*a* cooperates with the housing 22 to confine the engaging portion 244*a* within the first mounting groove 231. In the block M102, the engaging member 24 moves on the first inclined face 842 of the mating member 84 and squeezes the elastic member 26*a* towards the housing 22, so that the elastic member 26*a* is compressed. In the block M103, the elastic member 26*a* is restored to its original shape, and in this process, the engaging member 24 is restored by the driving of the elastic member 26*a*, so that the engaging portion 244*a* is accommodated in the recess 85.

In some embodiments, the recess 85 of the mating member 84 and the first inclined face 842 are connected by a transition face 848. After the block M102, that is, after the movement of the engaging member 24 on the first inclined face 842 is finished, the engaging member 24 does not enter the recess 85 immediately, but has to pass the transition face 848 between the recess 85 and the first inclined face 842. In this process, the engaging member 24 abuts against the transition face 848 until the mating member 84 moves to a point where the engaging member 24 is aligned with the recess, that is, the mating member 84 moves to the second position.

Figure 46:
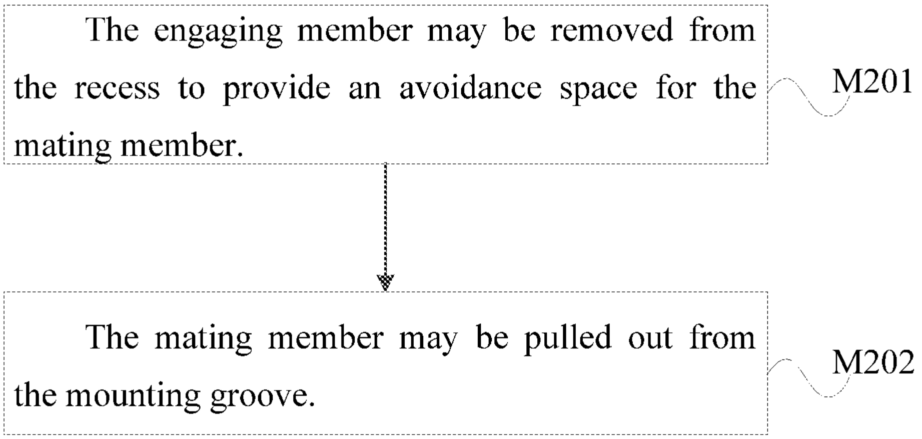
FIG. 46 is a schematic flowchart of a disassembly method of a housing assembly and a connector of the present disclosure.

The present disclosure further provides a method for disassembling the above-mentioned housing assembly and connector. As shown in the above embodiment, the mating member 84 is inserted into the mounting groove 232, and the engaging member 24 is accommodated in the recess 85, so as to connect the connector 80 and the housing assembly 20 by snap-fit. As shown in FIG. 46, the method of disassembling the housing assembly 22 and the connector 80 that are connected to each other by the snap-fit may include the following blocks.

In block M201: The engaging member may be removed from the recess to provide an avoidance space for the mating member.

In some embodiments, the engaging member 24 could be pulled away from the recess 85 by pressing or pulling the engaging member 24.

In block M202: The mating member may be pulled out from the mounting groove.

The following describes the methods of assembling and disassembling the connector and the housing assembly of the present disclosure through the embodiments shown in FIGS. 31-33:

When the mating member 84 of the connector 80 is inserted into the first mounting groove 231 in the first direction, that is, in the extending direction of the first groove wall 2314, the first inclined face 842 abuts against the second inclined face 248 in the first position, as shown in FIG. 31.

When the mating member 84 continues to be inserted into the first mounting groove 231 in the first direction towards the second position, the first inclined face 842 acts on the second inclined face 248, so that the engaging member 24 as a whole moves in the second direction, that is, in the extending direction of the second groove wall. Specifically, the pressing cap 242 moves in a direction towards the second mounting groove 233, that is, in a direction towards the bottom wall of the receiving hole 236. As the pressing cap 242 moves, the pressing cap 242 continues to compress the elastic member 26*a*. The second engagement portion 246 moves on the first inclined face 842 and moves in a direction away from the second mounting groove 233, thereby providing an avoidance space for the mating member 84. After the second engaging portion 246 passes the first inclined face 842, the second engaging portion 246 abuts against the transition face 848, and the mating member 84 continues to move toward the bottom wall 2312 until reaching the second position, as shown in FIG. 32. During the second engaging portion 246 is in a state of abutting against the transition face 848, the engaging member 24 stops moving in the second direction, that is, the pressing cap 242 no longer compresses the elastic member 26*a* in the direction towards the bottom wall of the receiving hole 236. Instead, the pressing cap 242 remains in the current position, and the elastic member 26*a* remains in the current compressed state. Throughout this process, the mating member 84 moves and remains in the state of abutting against the second engaging portion 246, so that the deformed elastic member 26*a* couldn't restore to its original shape.

When the mating member 84 reaches the second position, the recess 85 of the mating member 84 aligns with the second engaging portion 246. At this point, the mating member 84 no longer abuts against the second engaging portion 246. At this time, the elastic member 26*a* could restore to its original shape, so that the engaging member 24 is restored by the driving of the elastic member 26*a*. Specifically, when the elastic member 26*a* restores to its original shape, the engaging member 24 is driven to be restored. Specifically, the pressing cap 242 is driven by the elastic member 26*a* to move in the direction away from the second mounting groove 233, so that the second engaging portion 246 moves in a direction towards the second mounting groove 233, and the second engaging portion 246 falls into the recess 85 of the mating member 84 and restricts the mating member 84. As a result, the mating member 84 is locked in the first mounting groove 231, as shown in FIG. 33. The second engaging portion 246 could prevent the mating member 84 from exiting from the first mounting groove 231, thereby achieving the snap-fit between the connector 80 and the housing assembly 20.

When the connector 80 and the housing assembly 20 that are connected to each other by snap-fit are disassembled, first, the pressing cap 242 is pressed in the direction towards the second mounting groove 233, thereby squeezing the elastic member 26*a* to compress the elastic member 26*a*, the movement of the pressing cap 242 causes the engaging member 24 to move. Specifically, the second engaging portion 246 moves in a direction away from the second mounting groove 233 to exit the recess 85, so as to provide the avoidance space for the mating member 84 and no longer restrict the mating member 84 anymore.

Then, the mating member 84 is pulled out from the first mounting groove 231.

After the pressing cap 242 is released, the elastic member 26*a* restores to its original shape and drives the engaging member 24 to be restored. Specifically, the pressing cap 242 moves in a direction away from the second mounting groove 233, and the second engaging portion 246 moves in a direction towards the second mounting groove 233, which causes the engaging member 24 to be restored to its initial state. In this situation, the outer face of the pressing cap 242 may be flush with the outer face of the bottom lid 25.

In the present disclosure, when assembling the housing assembly and the connector of the wearable apparatus in the present disclosure, the user only needs to insert the connector into the housing assembly, and push the engaging member of the housing assembly with an inclined face provided on the mating member of the connector to offer an avoidance space. Therefore, the mating member could be inserted to a predefined location in the housing assembly, and locked in the housing assembly by the engaging member which is restored and accommodated in the recess. When disassembling the housing assembly and the connector, the user only needs to remove the engaging member from the recess to provide an avoidance space for the mating member; and pull out the mating member from the housing assembly. The process of assembly and disassembly is simple, labor-saving and quick, which could improve the user's experience, and make the connection between the connector and the electronic apparatus to be more reliable.

In some embodiments, the wearable apparatus of the present disclosure may be described as follows.

The wearable apparatus may include a case (also called as a housing), a band (also called as a strap) and a locking structure (also called as an engaging member). The band is attached on the case and detachable from the case, and the band includes a strap-shaped body and a connector connected to the strap-shaped body; and the connector includes a first mating portion; the locking structure is installed on the case and movable in the case, and the locking structure includes a second mating portion; in a process of installing the connector to the case, the locking structure is driven by the connector to move from a first position to a second position, so that the connector is inserted into the case; after the locking structure reaches the second position, the locking structure is further driven to move from the second position to a third position; when the locking structure reaches the third position, the first mating portion is matched with the second mating portion, so that the band is fixed on the case; and the third position is between the first position and the second position, or the third position is the same as the first position; after the first mating portion is matched with the second mating portion, the locking structure is driven to move from the third position to a fourth position; after the locking structure reaches the fourth position, a matching between the first mating portion and the second mating portion is released, so that the connector is detached from the case; and the fourth position is the same as the second position, or the fourth position is further away from the first position than the second position.

In some embodiments, in the process of installing the connector to the case, the connector is inserted into the case, and the connector pushes the locking structure to move from the first position to the second position; the wearable device includes a first magnet and a second magnet, the first magnet is connected to the locking structure, and the second magnet is connected to the case; after the locking structure reaches the second position, a magnetic repulsion force is generated between the first magnet and the second magnet, and the magnetic repulsion force drives the locking structure to move from the second position to the third position.

In some embodiments, in the process of installing the connector to the case, the connector is inserted into the case, and the connector pushes the locking structure to move from the first position to the second position; the wearable device includes an elastic unit, one end of the elastic unit is connected to the case, and the other end of the elastic unit is connected to the locking structure; after the locking structure reaches the second position, the elastic unit drives the locking structure to move from the second position to the third position.

In some embodiments, the case includes a first mounting slot and a second mounting slot on a surface of the case, the first mounting slot and the second mounting slot are interconnected to each other in the interior of the case; the locking structure includes a key and a connecting section connected to the key, and the connecting section includes the second mating portion; when the key is pressed, the key moves in the second mounting slot and drives the connecting section to move in the first mounting slot, so that the band is inserted into the case from the first mounting slot.

In some embodiments, the key includes a key cap and an extension section connected to the key cap, and the extension section is firmly connected to the connecting section; one end of the elastic unit is connected to the key cap, the other end of the elastic unit is connected to the case; when the locking structure moves from the first position to the second position, the elastic unit transforms from an original released state to a compressed state or transforms from a first compressed state to a second compressed state with a compression degree greater than that of the first compressed state.

In some embodiments, the key further includes two pillars located on one side of the key cap facing the connecting section, and the two pillars are located on opposite two sides of the extension section; the case includes a receiving hole; the elastic unit is a spring; one of the pillars is inserted in one end of the elastic unit, and the other end of the elastic unit is accommodated in the receiving hole and connected to the case.

In some embodiments, one of the extension section and the connecting section includes a fixing block, and the other of the extension section and the connecting section includes a groove matched with the fixing block; and the fixing block is stuck in the groove so that a position of the key relative the connecting section is constant.

In some embodiments, the groove is located on the connecting section, and the fixing block is connected to the extension section; the key is installed on the case from the second mounting slot, so that the fixing block is accommodated in the first mounting slot; and the connecting section is installed on the case from the first mounting slot, so that the fixing block is located in the groove.

In some embodiments, the groove is a dovetail groove, and the fixing block is matched with the groove under interference fit or over matching.

In some embodiments, one end of the elastic unit is connected to the end of the connecting section far away from the key, and the other end of the elastic unit is connected to the case; when the locking structure moves from the first position to the second position, the elastic unit transforms from an original released state to a compressed state or transforms from a first compressed state to a second compressed state with a compression degree greater than that of the first compressed state.

In some embodiments, the end of the first mating portion far away from the strap-shaped body includes a first connecting surface, and the connector includes a first depression region located between the strap-shaped body and the first connecting surface; in the process of installing the connector to the case, the first connecting surface touches the locking structure and pushes the locking structure to move from the first position to the second position; when the locking structure reaches the third position, the second mating portion is accommodated in the first depression region and limited in the first depression region by the first mating portion.

In some embodiments, the first connecting surface is a flat surface and located on one side of the first depression region opposite to the strap-shaped body, and an angle of the first connecting surface and a moving direction of the locking structure is an acute angle.

In some embodiments, the first mating portion includes a first transition surface located between the first depression region and the first connecting surface, and the first transition surface is flat surface and substantially perpendicular to the moving direction of the locking structure; after the locking structure reaches the second position, the connector continues to move towards the case, so that the first transition surface touches the second mating portion and continues to move until the first transition surface is separated from the second mating portion; after the second mating portion is separated from the first transition surface, the second mating portion is driven to move to the third position.

In some embodiments, the first mating portion includes a first transition surface located between the first depression region and the first connecting surface, and the first transition surface is an arc surface; after the locking structure reaches the second position, the connector continues to move towards the case, so that the first transition surface touches the second mating portion and continues to move until the first transition surface is separated from the second mating portion; after the second mating portion is separated from the first transition surface, the second mating portion is driven to move to the third position.

In some embodiments, the second mating portion includes a second connecting surface facing an inserting direction of the connector; in the process of installing the connector to the case, the first connecting surface touches the second connecting surface and pushes the locking structure to move from the first position to the second position.

In some embodiments, the second connecting surface is a flat surface and an angle of the second connecting surface and the moving direction of the locking structure is an acute angle.

In some embodiments, the second mating portion includes a second connecting surface facing an inserting direction of the connector, and the second mating portion further includes a second depression region on one side of the second mating portion opposite the second connecting surface; in the process of installing the connector to the case, the connector touches the second connecting surface and pushes the locking structure to move from the first position to the second position; and when the locking structure reaches the third position, the first mating portion is accommodated in the second depression region and limited in the second depression region by the second mating portion.

In some embodiments, the second connecting surface is a flat surface, and an angle of the second connecting surface and the moving direction of the locking structure is an acute angle.

In some embodiments, the second mating portion includes a second transitional surface located between the second depression region and the second connecting surface, the second transitional surface is a flat surface and substantially perpendicular to the moving direction of the locking structure; after the locking structure reaches the second position, the connector continues to move towards the case, the first mating portion touches the second transition surface and continues to move until the first mating portion is separated from the second transition surface; after the first mating portion is separated from the second transition surface, the second mating portion is driven to move to the third position.

In some embodiments, the second mating portion includes a second transitional surface located between the second depression region and the second connecting surface, the second transitional surface is an arc surface; after the locking structure reaches the second position, the connector continues to move towards the case, the first mating portion touches the second transition surface and continues to move until the first mating portion is separated from the second transition surface; after the first mating portion is separated from the second transition surface, the second mating portion is driven to move to the third position.

The above description may only be implementations of the present disclosure, but may not limit the scope of the present disclosure. Any equivalent structural and process transformation based on contents of the present specification and the accompanying figures, and any direct or indirect application of the present disclosure in other related art should be within the scope of the present disclosure.

What is claimed is:

1. An electronic apparatus, comprising:

a housing assembly, configured to connect with a connector, and comprising:

a housing, defining a mounting groove; and an engaging member, arranged in the mounting groove and capable of moving relative to the housing to engage with the connector or disengage the connector; and an electronic component, disposed in the housing;

wherein the housing defines a sink, the housing assembly further comprises a baffle mounted in the sink, the baffle defines a through hole being configured to let the connector pass therethrough.

2. The electronic apparatus according to claim 1, wherein the engaging member is configured to move to provide an avoidance space for the connector to be inserted into or removed from the mounting groove; during the movement of the connector from a first position to a second position in the mounting groove, the engaging member is configured to move within a limited position and to engage with the connector when the connector in the second position.

3. The electronic apparatus according to claim 1, wherein the sink defines a sleeve structure surrounding at least an end portion of the baffle.

4. The electronic apparatus according to claim 3, wherein the sleeve structure of the sink and the baffle cooperatively define a semi-open accommodating space which has a sleeve structure, and the accommodating space is configured to accommodate a part of the connector.

5. The electronic apparatus according to claim 4, wherein the thickness of the baffle is less than the depth of the sink, walls of the sink and an outside face of the baffle define the semi-open accommodating space, and the semi-open accommodating space are configured to conceal at least a part of the connector.

6. The electronic apparatus according to claim 1, wherein the mounting groove comprises a first mounting groove and a second mounting groove connecting with each other, and the first mounting groove has a first opening and the second mounting groove has a second opening; and the first opening is defined by a bottom wall of the sink, the first opening being configured to let the connector pass therethrough.

7. The electronic apparatus according to claim 6, wherein the engaging member is configured to engage with the connector, in the first mounting groove.

8. The electronic apparatus according to claim 6, wherein a third opening is defined on the second groove wall of the second mounting groove, the baffle is further disposed at the third opening, and the engaging member is an integrated structure.

9. The electronic apparatus according to claim 1, wherein the shape of the baffle matches the shape of the sink.

10. The electronic apparatus according to claim 6, wherein the engaging member comprises an engaging portion and a pressing portion connected to each other, the pressing portion is disposed in the second mounting groove and exposed to the second opening, and the engaging portion is disposed in the first mounting groove, and configured to confine the engaging portion in the first mounting groove and to engage with the connector.

11. An electronic apparatus, comprising:

a housing assembly, configured to connect with a connector, and comprising:

a housing, defining a mounting groove; and an engaging member, arranged in the mounting groove and capable of moving relative to the housing to engage with the connector or disengage the connector; and an electronic component, disposed in the housing;

wherein the mounting groove comprises a first mounting groove and a second mounting groove connecting with each other, and the first mounting groove has a first opening and the second mounting groove has a second opening; the engaging member comprising an engaging portion and a pressing portion connected to each other; the engaging portion is configured to be mounted in the first mounting groove through the first opening, and the pressing portion is configured to be mounted in the second mounting groove through the second opening; the engaging member is configured to engage with the connector.

12. The electronic apparatus according to claim 11, wherein the engaging member comprises a first engaging portion and a second engaging portion connected successively, the first engaging portion is disposed in the first mounting groove, configured to confine the first engaging portion and the second engaging portion in the first mounting groove by an engagement between the first engaging portion and the housing; the second engaging portion is configured to engage with the connector.

13. The electronic apparatus according to claim 12, wherein in a direction perpendicular to an extending direction of the second mounting groove, a width of the first engaging portion is larger than a width of the second mounting groove to confine the first engaging portion in the first mounting groove.

14. The electronic apparatus according to claim 11, wherein the housing defines a sink, and the first opening is defined by a bottom wall of the sink; and the housing assembly further comprises a baffle; the baffle is mounted in the sink, and the baffle defines a through hole which the connector passes.

15. The electronic apparatus according to claim 14, wherein the baffle includes a first face and a second face disposed opposite to each other, the first face faces the first mounting groove and is configured to confine the engaging portion in the first mounting groove, the baffle defines a through hole penetrating through the first face and the second face, and the through hole connects with the first opening.

16. The electronic apparatus according to claim 14, wherein the shape of the baffle matches the shape of the sink; the sink defines a sleeve structure surrounding at least an end portion of the baffle, the sleeve structure of the sink and the baffle cooperatively define a semi-open accommodating space which has a sleeve structure; and the semi-open accommodating space is configured to conceal at least a part of the connector.

17. A wearable apparatus, comprising:

a connector;

a strap body, wherein the strap body is connected to the connector; and an electronic apparatus, comprising:

a housing assembly, configured to connect with the connector, and comprising:

a housing, configured to accommodate an electronic component, the housing defining a mounting groove;

an engaging member, arranged in the mounting groove and capable of moving relative to the housing to engage with the connector or disengage the connector; and a baffle being coupled to the housing, wherein the baffle defines a through hole being configured to let the connector pass therethrough.

18. The wearable apparatus according to claim 17, wherein the connector comprises a mating member, the mating member defining a recess; the mating member is configured to pass the through hole to be inserted into or exit from the electronic apparatus; and the engaging member is configured to be accommodated in the recess to engage with the connector.

19. The wearable apparatus according to claim 17, wherein the housing defines a sink, the baffle is mounted in the sink, wherein the shape of the baffle matches the shape of the sink; the sink and the baffle cooperatively define a semi-open accommodating space which has a sleeve structure, and the accommodating space is configured to accommodate a part of the strap body.

20. The wearable apparatus according to claim 18, wherein the width of the recess in a direction in which the mating member is inserted into the electronic apparatus is less than the thickness of the middle portion of the baffle.

* * * * *